US011694383B2

(12) United States Patent
Joo et al.

(10) Patent No.: US 11,694,383 B2
(45) Date of Patent: Jul. 4, 2023

(54) EDGE DATA NETWORK FOR PROVIDING THREE-DIMENSIONAL CHARACTER IMAGE TO USER EQUIPMENT AND METHOD FOR OPERATING THE SAME

(71) Applicant: Samsung Electronics Co., Ltd., Suwon-si (KR)

(72) Inventors: Younghyun Joo, Suwon-si (KR); Seonhee Kim, Suwon-si (KR); Younggi Kim, Suwon-si (KR); Jeonghun Kim, Suwon-si (KR); Hyokyung Woo, Suwon-si (KR); Hyoyoung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 17/601,602

(22) PCT Filed: Aug. 4, 2021

(86) PCT No.: PCT/KR2021/010276
§ 371 (c)(1),
(2) Date: Oct. 5, 2021

(87) PCT Pub. No.: WO2022/031041
PCT Pub. Date: Feb. 10, 2022

(65) Prior Publication Data
US 2022/0309725 A1 Sep. 29, 2022

(30) Foreign Application Priority Data

Aug. 7, 2020 (KR) .................. 10-2020-0099260

(51) Int. Cl.
*G06T 13/40* (2011.01)
*G06T 7/73* (2017.01)
(Continued)

(52) U.S. Cl.
CPC ............ *G06T 13/40* (2013.01); *G06T 1/60* (2013.01); *G06T 7/248* (2017.01); *G06T 7/74* (2017.01);
(Continued)

(58) Field of Classification Search
None
See application file for complete search history.

(56) References Cited

U.S. PATENT DOCUMENTS

| 8,970,656 B2 | 3/2015 | Goodman et al. |
| 11,055,889 B2 | 7/2021 | Lee et al. |
| (Continued) | | |

FOREIGN PATENT DOCUMENTS

| CN | 111353930 A | 6/2020 |
| KR | 10-2012-0018479 A | 3/2012 |
| (Continued) | | |

OTHER PUBLICATIONS

Jie Huang et al. "Intelligent Video Surveillance of Tourist Attractions Based on Virtual Reality Technology", Aug. 2020 (Year: 2020).*

(Continued)

*Primary Examiner* — James A Thompson
*Assistant Examiner* — Kim Thanh T Tran
(74) *Attorney, Agent, or Firm* — Jefferson IP Law, LLP

(57) ABSTRACT

An edge data network for providing a three-dimensional (3D) character image to a user equipment and an operating method thereof are provided. The edge data network obtains key points information including feature point coordinates related to the body parts of a first user, from a first user equipment via a network, and obtains view points information including virtual position coordinate value information of virtual view points from which a second user views a 3D character image from a second user equipment, measures a key points similarity and a view points similarity by respectively comparing the obtained key points information and view points information with key points information and view points information cached in a data cache, and reads out a 3D character image cached in the data cache based on the measured key points similarity and the measured view points similarity, and transmits the read out 3D character image to the second user equipment.

15 Claims, 14 Drawing Sheets

(51) Int. Cl.
*G06T 7/246* (2017.01)
*G06T 1/60* (2006.01)
*H04L 67/289* (2022.01)

(52) U.S. Cl.
CPC .. *H04L 67/289* (2013.01); *G06T 2207/30196* (2013.01)

(56) References Cited

U.S. PATENT DOCUMENTS

| | | |
|---|---|---|
| 11,079,897 B2 | 8/2021 | Yerli |
| 2014/0289323 A1* | 9/2014 | Kutaragi ............... G06Q 50/01 709/206 |
| 2018/0176277 A1* | 6/2018 | Kuo ..................... H04L 65/765 |
| 2019/0253667 A1 | 8/2019 | Valli |
| 2019/0266775 A1* | 8/2019 | Lee ..................... G06V 40/166 |
| 2021/0012530 A1 | 1/2021 | Zheng |

FOREIGN PATENT DOCUMENTS

| | | |
|---|---|---|
| KR | 10-2018-0123248 A | 11/2018 |
| KR | 10-2019-0005144 A | 1/2019 |
| KR | 10-2019-0101834 A | 9/2019 |
| KR | 10-2019-0134513 A | 12/2019 |
| KR | 10-2020-0072321 A | 6/2020 |

OTHER PUBLICATIONS

International Search Report and Written Opinion dated Nov. 4, 2021, issued in International Patent Application No. PCT/KR2021/010276.

* cited by examiner

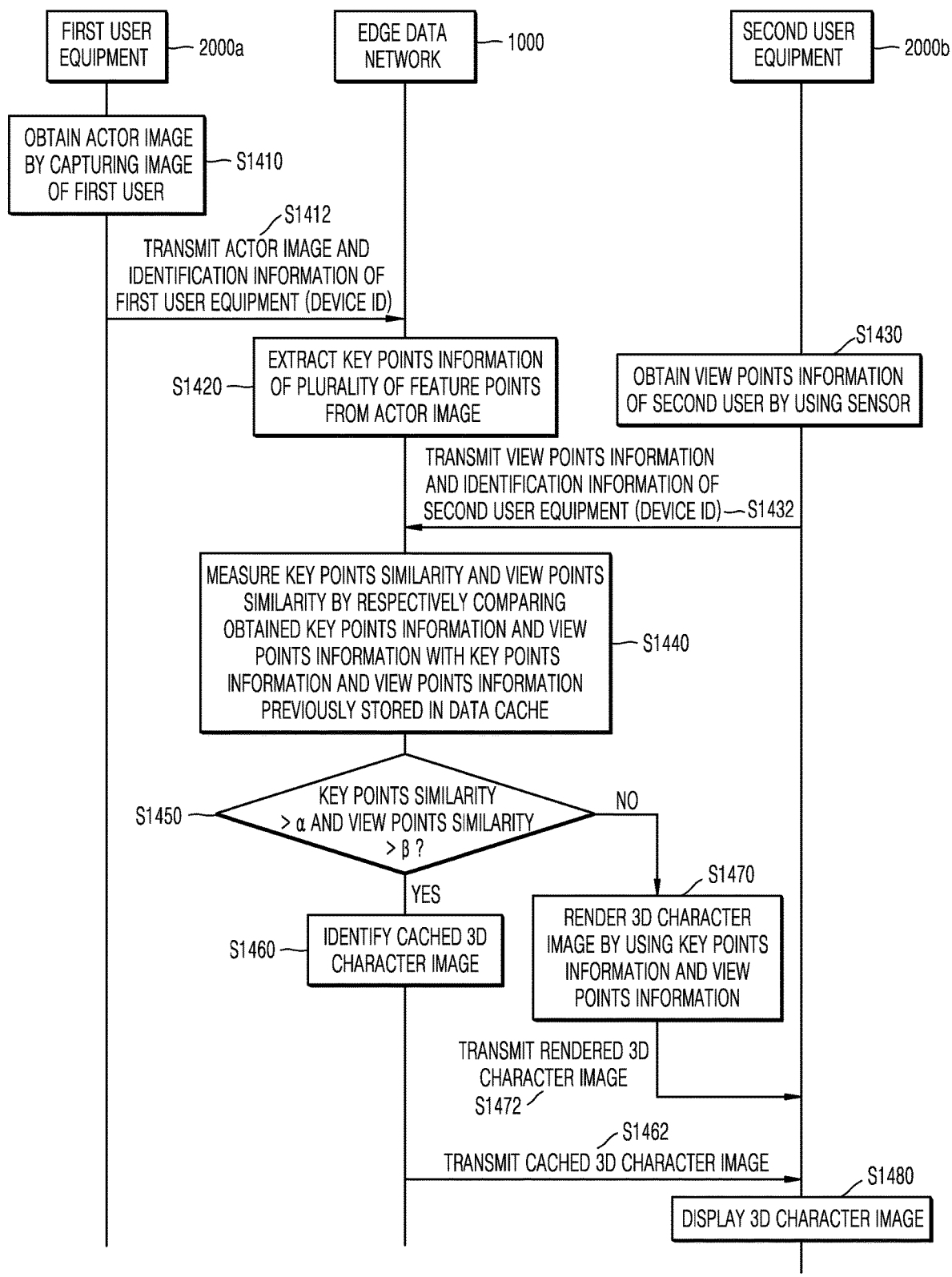

EDGE DATA NETWORK FOR PROVIDING THREE-DIMENSIONAL CHARACTER IMAGE TO USER EQUIPMENT AND METHOD FOR OPERATING THE SAME

TECHNICAL FIELD

The disclosure relates to an edge data network for providing a three-dimensional (3D) character image to a user equipment and an operating method thereof. More particularly, the disclosure relates to a method, performed by an edge data network performing an Augmented Reality Telepresence with a first user equipment and a second user equipment, of providing a 3D character image of a user to the second user equipment, and the edge data network.

BACKGROUND ART

Recently, edge computing technology of transmitting data using an edge server has been discussed. The edge computing technology may include, for example, multi-access edge computing (MEC) or fog computing (FOC). Edge computing technology may refer to a technique of providing data to an electronic device through a separate sever installed at a location geographically adjacent to the electronic device, for example, inside or near a base station (hereinafter referred to as 'edge data network' or 'MEC server'). For example, an application requiring low latency among at least one application installed in an electronic device may transmit or receive data via an edge server installed at a geographically adjacent location, without going through a server located in an external data network (DN) (e.g., the Internet).

Recently, a service using edge computing technology (hereinafter, referred to as 'MEC-based service' or 'MEC service') has been discussed, and research and development on electronic devices to support MEC-based services are in progress. In particular, the electronic device may perform augmented reality telepresence (AR Telepresence) based on edge computing on an edge server (or an application of the edge server) and an application layer through an application. In an augmented reality telepresence application, an actor device and a viewer device hold a meeting using a 3D Avatar image through an MEC server (edge data network). Because the augmented reality telepresence application requires high quality and high performance, in order to render a 3D Avatar image, it takes a long processing time due to the large amount of computation by the MEC server, and the amount of data transmitted through a network is large, thus increasing the cost for using the network. In particular, due to the nature of a meeting, the degree or frequency of users' movements is small, and certain actions are often repeated, but because 3D Avatar images are rendered with respect to all actions or movements of the users, computing power is inefficiently consumed.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide a method and apparatus for providing a 3D character image to a user equipment by using an edge computing service.

Another aspect of the disclosure is to provide a method and apparatus for storing a previously generated 3D character images in a data cache and transmitting, to a user equipment, a cached 3D character image with respect to identical or similar motion or actions of a user of a user equipment, in order to save computing resources and shorten the processing time for 3D character image rendering.

Additional aspects will be set forth in part in the description which follows and, in part, will be apparent from the description, or may be learned by practice of the presented embodiments.

Technical Solution to Problem

In accordance with an aspect of the disclosure, a method, performed by an edge data network, of providing a three-dimensional (3D) character image to a user equipment is provided. The method includes obtaining first key points information including a plurality of feature coordinate values related to the body parts, posture, or skeletal structure of a first user, extracted from a first image frame captured using a first user equipment, and first view points information including virtual position coordinate value information of virtual view points from which a 3D character image displayed via a second user equipment is viewed, rendering a 3D character image indicating the appearance, action, or motion of the first user based on the obtained first key points information and first view points information, storing the rendered 3D character image in a data cache in association with the first key points information and the first view points information, obtaining second key points information and second view points information regarding a second image frame obtained after the first image frame, measuring a key points similarity and a view points similarity by respectively comparing the obtained second key points information and second view points information with the first key points information and the first view points information previously stored in the data cache, and providing the 3D character image previously stored in the data cache to the second user equipment as a 3D character image regarding the second image frame based on the measured key points similarity and the measured view points similarity.

In an embodiment, the obtaining of the first key points information and the first view points information may include receiving the first key points information from another edge data network located remotely.

In an embodiment, the obtaining of the first key points information and the first view points information may include receiving the first image frame obtained by capturing an image of the first user by using the first user equipment, from the first user equipment, extracting a plurality of position coordinate values of a plurality of feature coordinate values related to the body parts, posture, or skeletal structure of the first user, from the received first image frame, and obtaining the first key points information including the extracted plurality of position coordinate values.

In an embodiment, the rendering of the 3D character image may include receiving user identification information of the first user, and rendering the 3D character image by using a previously generated 3D character image according to the received user identification information.

In an embodiment, the storing of the 3D character image in the data cache may include storing, together with the 3D character image in the data cache, at least one of user identification information of the first user, a plurality of pieces of previously obtained key points information regarding the appearance, actions conducted in the past, motions, postures or directions of the first user, priority information for determining a key points similarity, and information about a teleconference type.

In an embodiment, the measuring of the key points similarity may include obtaining third key points information including a plurality of third feature point coordinate values extracted from a third image frame, respectively calculating a difference value between the plurality of third feature coordinate values included in the third key points information and a plurality of second feature coordinate values included in the second key points information, identifying at least one third feature coordinate value having the calculated difference value exceeding a preset threshold, identifying at least one first feature coordinate value corresponding to the identified at least one third feature coordinate value from among a plurality of first feature coordinate values included in the first key points information stored in the data cache, and measuring a key points similarity between the third key points information and the first key points information by measuring a similarity between the identified at least one third feature coordinate value and the at least one first feature coordinate value.

In an embodiment, the measuring of the key points similarity may include selecting at least one second feature coordinate value extracted from a body part having a high priority according to predetermined priorities, from among a plurality of second feature coordinate values included in the second key points information, identifying at least one first feature coordinate value corresponding to the selected at least one second feature coordinate value from among a plurality of first feature coordinate values included in the first key points information, and measuring the key points similarity by measuring a similarity between the at least one first feature coordinate value and the at least one second feature coordinate value.

In an embodiment, the priorities may be determined based on a degree and frequency of motion of the body parts of the first user according to a type of a teleconference conducted via the edge data network.

In an embodiment, the method of may further include calculating a difference value between a plurality of feature coordinate values respectively included in the plurality of pieces of key points information previously obtained through a previously conducted teleconference and stored in the data cache, listing the calculated difference values in order from large to small, and determining a priority according to the body parts respectively corresponding to a plurality of position coordinate values based on the order of the listed difference values.

In an embodiment, a plurality of pieces of key points information constituting a motion may be classified according to motion information and stored in the data cache, wherein the measuring of the key points similarity includes receiving a plurality of pieces of key points information respectively extracted from a plurality of image frames sequentially obtained according to the time flow, and measuring a similarity between the plurality of pieces of input key points information and the plurality of pieces of key points information previously stored in the data cache, wherein the method further includes identifying motion information corresponding to the input plurality of pieces of key points information based on the measured similarity, and obtaining a plurality of 3D character image frames corresponding to the identified motion information from the data cache.

In accordance with another aspect of the disclosure, an edge data network for providing a 3D character image to a user equipment is provided. The edge data network includes a network interface, a memory storing a program including one or more instructions, and a processor configured to execute the one or more instructions of the program stored in the memory, wherein the processor is configured to control the network interface to obtain, by using the network interface, first key points information including a plurality of feature coordinate values related to the body parts, posture, or skeletal structure of a first user, extracted from a first image frame captured using a first user equipment, and first view points information including virtual position coordinate value information regarding virtual view points from which a 3D character image displayed via a second user equipment is viewed, render a 3D character image indicating the appearance, action, or motion of the first user based on the obtained first key points information and first view points information, store the rendered 3D character image in a data cache in the memory in association with the first key points information and the first view points information, respectively obtain second key points information and second view points information of a second image frame obtained after the first image frame, by using the network interface, measure a key points similarity and a view points similarity by respectively comparing the obtained second key points information and second view points information with the first key points information and the first view points information previously stored in the data cache, and provide a 3D character image previously stored in the data cache to the second user equipment as a 3D character image regarding the second image frame based on the measured key points similarity and the measured view points similarity.

In an embodiment, the processor may be configured to receive the first key points information from another edge data network located remotely, by using the network interface.

In an embodiment, the processor may be configured to, by using the network interface, receive the first image frame obtained by capturing an image of the first user by using the first user equipment, from the first user equipment, extract a plurality of position coordinate values of a plurality of feature coordinate values related to the body parts, posture, or skeletal structure of the first user, from the received first image frame, and obtain the first key points information including the extracted plurality of position coordinate values.

In an embodiment, the processor may be configured to, by using the network interface, receive user identification information of the first user and render the 3D character image by using a previously generated 3D character image according to the received user identification information.

In an embodiment, the processor may be configured to store, together with the 3D character image in the data cache, at least one of user identification information of the first user, a plurality of pieces of previously obtained key points information regarding the appearance, actions conducted in the past, motions, postures or directions of the first user, priority information for determining a key points similarity, and information about a teleconference type.

In an embodiment, the processor may be configured to, by using the network interface, obtain third key points information including a plurality of third feature point coordinate values extracted from a third image frame, respectively calculate a difference value between the plurality of third feature coordinate values included in the third key points information and a plurality of second feature coordinate values included in the second key points information, identify at least one third feature coordinate value having the calculated difference value exceeding a preset threshold, identify at least one first feature coordinate value corresponding to the identified at least one third feature coordinate value from among a plurality of first feature coordinate values included in the first key points information stored in the data cache, and measure a key points similarity between the third key points information and the first key points information by measuring a similarity between the identified at least one third feature coordinate value and the at least one first feature coordinate value.

In an embodiment, the processor may be configured to select at least one second feature coordinate value extracted from a body part having a high priority according to predetermined priorities, from among a plurality of second feature coordinate values included in the second key points information, identify at least one first feature coordinate value corresponding to the selected at least one second feature coordinate value from among a plurality of first feature coordinate values included in the first key points information, and measure the key points similarity by measuring a similarity between the at least one first feature coordinate value and the at least one second feature coordinate value.

In an embodiment, the processor may be configured to calculate a difference value between a plurality of feature coordinate values respectively included in the plurality of pieces of key points information previously obtained through a previously conducted teleconference and stored in the data cache, list the calculated difference values in order from large to small, and determine a priority according to the body parts respectively corresponding to a plurality of position coordinate values based on the order of the listed difference values.

In an embodiment, a plurality of pieces of key points information constituting a motion may be classified according to motion information and stored in the data cache, wherein the processor is configured to receive a plurality of pieces of key points information respectively extracted from a plurality of image frames sequentially obtained according to the time flow, measure a similarity between the plurality of pieces of input key points information and the plurality of pieces of key points information previously stored in the data cache, identify motion information corresponding to the input plurality of pieces of key points information based on the measured similarity, and obtain a plurality of 3D character image frames corresponding to the identified motion information from the data cache.

In accordance with another aspect of the disclosure, a computer program product including a computer-readable storage medium having recorded thereon a program for executing the method described above on a computer is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 14 is a diagram for describing a structure of modules of each of an edge data network and a user equipment, and data transmission and reception therein according to an embodiment of the disclosure.

Throughout the drawings, like reference numerals will be understood to refer to like parts, components, and structures.

MODE OF DISCLOSURE

Figure 1:
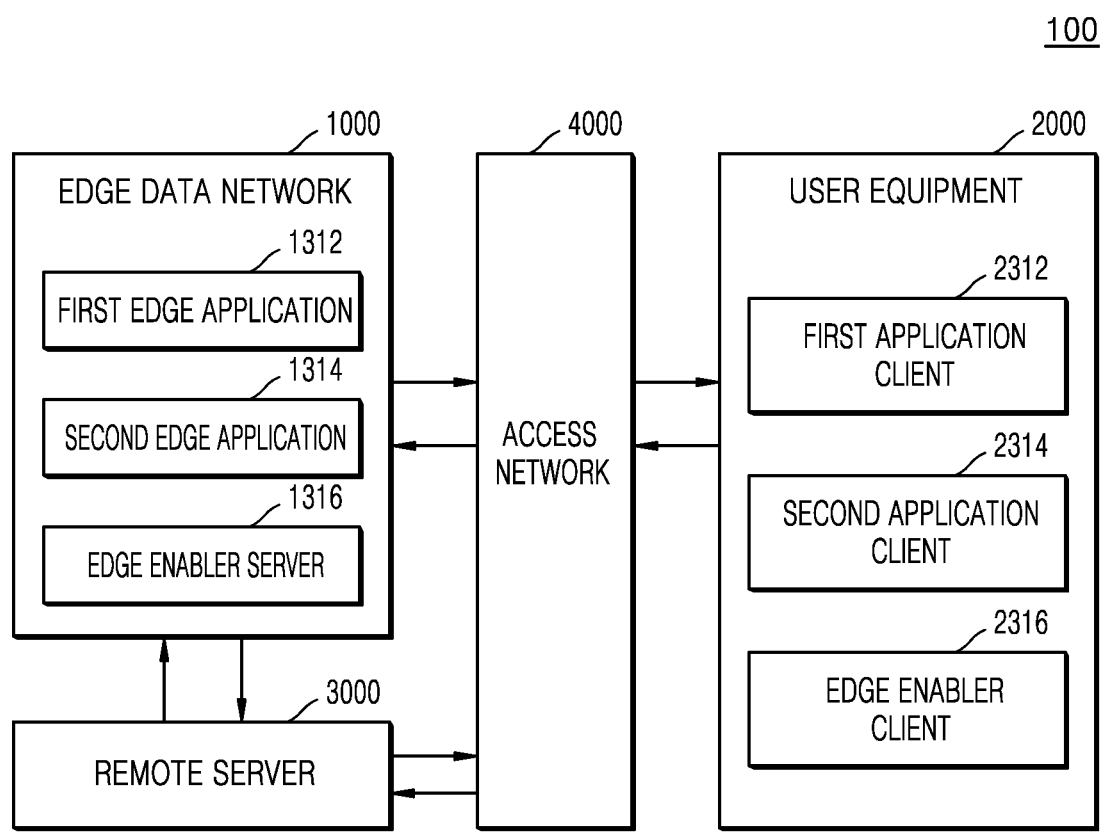
FIG. 1 is a schematic diagram illustrating a multi-access edge computing (MEC) technology in a network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

For the same reason, in the attached drawings, each constituent element is exaggerated, omitted, or schematically illustrated. In addition, the size of each constituent element does not perfectly reflect an actual size. Those components that are the same or are in correspondence are rendered the same reference numeral regardless of the figure number.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. The scope of the disclosure is only defined in the claims. Throughout the specification, like reference numerals or characters refer to like elements.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operations to be performed on the computer or other programmable data processing equipment to produce a computer-executable process such that the instructions that are executed on the computer or other programmable data processing equipment provide operations for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

In the disclosure, terms such as " . . . unit", " . . . module", or the like refer to units that perform at least one function or operation, and the units may be implemented as hardware or software or as a combination of hardware and software. However, " . . . unit" or " . . . module" is not limited to software or hardware. The term " . . . unit" or " . . . module" may be configured to be included in an addressable storage medium or to reproduce one or more processors. Thus, according to an embodiment, the term " . . . unit" or " . . . module" may include, by way of example, object-oriented software components, class components, and task components, and processes, functions, attributes, procedures, subroutines, segments of a program code, drivers, firmware, a micro code, a circuit, data, a database, data structures, tables, arrays, and variables.

In the disclosure, a 'user equipment' refers to an electronic device used by a user. A user equipment may refer to, for example, a user equipment (UE), a mobile station, a subscriber station, a remote user equipment, a wireless user equipment, or a user device. According to an embodiment of the disclosure, a 'user equipment' may refer to an electronic device that displays a three-dimensional (3D) character image to allow an augmented reality (AR) telepresence to be conducted.

In the disclosure, an 'edge data network' may refer to a server accessed by a user equipment to use a mobile edge computing service. In an embodiment, an edge data network may be referred to as a MEC host, an edge computing server, a mobile edge host, an edge computing platform, an MEC server, or the like.

In the disclosure, an 'image frame' is a unit of a still image included in a moving picture or a video.

In the disclosure, a 'three-dimensional character image' refers to an image showing the appearance, action, or motion of a user, and may be at least one of an Avatar image, a cartoon character image, or an emoticon image.

FIG. 1 is a schematic diagram illustrating a multi-access edge computing (MEC) technology in a network according to an embodiment of the disclosure.

Referring to FIG. 1, a network environment 100 of the disclosure may include an edge data network 1000, a user equipment 2000, a remote server 3000, and an access network (AN) 4000. However, configurations included in the network environment 100 are not limited thereto.

According to an embodiment, each component included in the network environment 100 may refer to a physical entity unit or a software or module unit capable of performing individual functions.

According to an embodiment, the access network 4000 may provide a channel for wireless communication between the edge data network 1000 and the user equipment 2000. For example, the access network 4000 may refer to a radio access network (RAN), a base station, an eNodeB (eNB), a 5th generation (5G) node, a transmission/reception point (TRP), or a 5th generation NodeB (5GNB).

According to an embodiment, the edge data network 1000 may refer to a server that the user equipment 2000 accesses to use an MEC service. The edge data network 1000 may be installed at a geographically adjacent location to the user equipment 2000, for example, inside or near a base station. According to an embodiment, the edge data network 1000 may transmit or receive data to or from the user equipment 2000 without going through an external data network (DN) (e.g., the Internet). In an embodiment, MEC may be referred to as multi-access edge computing or mobile-edge computing.

According to an embodiment, the edge data network 1000 may be referred to as a MEC host, an edge computing server, a mobile edge host, an edge computing platform, an MEC server, or the like. For convenience, in the disclosure, an MEC server is referred to as the edge data network 1000 below. Referring to FIG. 1, the edge data network 1000 may include a first edge application 1312, a second edge application 1314, and an edge enabler server (or MEC platform (MEP)) 1316. The edge enabler server 1316 may be a configuration that provides an MEC service or performs traffic control in the edge data network 1000, and will be described in detail later.

According to an embodiment, the edge data network 1000 may execute a plurality of applications. For example, the edge data network 1000 may execute a first edge application 1312 and a second edge application 1314. According to an embodiment, an edge application may refer to an applied application provided by a third party in an edge data network in which an MEC service is provided, and may be referred to as an edge application. An edge application may be used in establishing a data session with an application client to transmit or receive data related to an application client. That is, an edge application may establish a data session with an application client. According to an embodiment, a data session may refer to a communication path established for an application client of the user equipment 2000 and an edge application of the edge data network 1000 to transmit or receive data.

According to an embodiment, an application of the edge data network 1000 may be referred to as an MEC application (MEC App), an ME (MEC) App, an edge application server, or an edge application. For convenience, an application of the edge data network 1000 will now be referred to as an edge application. Here, while an edge application is described as 'application,' the edge application may refer to an application server existing in an edge data network.

According to an embodiment of the disclosure, when a first application client 2312 or a second application client 2314 is executed on a user equipment 2000, the user equipment 2000 may access the edge data network 1000 via the access network 4000 to transmit or receive data for executing the edge application.

According to an embodiment, the user equipment 2000 may refer to a device used by a user. For example, the user equipment 2000 may include a user equipment, a user equipment (UE), a mobile station, a subscriber station, a remote user equipment, a wireless user equipment, or a user device.

According to an embodiment, the user equipment 2000 may refer to an electronic device displaying a 3D character image to allow to perform an augmented reality telepresence (AR Telepresence). The user equipment 2000 may be, for example, a mobile device including at least one of a smart-phone, a tablet personal computer (PC), a mobile phone, a video phone, an e-book reader, a desktop personal computer (PC), a laptop personal computer (PC), a netbook computer, a workstation, a personal digital assistant (PDA), a portable multimedia player (PMP), a moving picture experts group (MPEG-1 or MPEG-2) audio layer 3 (MP3) player, a mobile medical device, or wearable device. However, the disclosure is not limited thereto, and the user equipment 2000 may be a head mounted display (HMD) or a virtual reality headset (VRH) that provides content for virtual reality, augmented reality, or mixed reality.

Referring to FIG. 1, the user equipment 2000 may include the first application client (or application client) 2312, the second application client 2314, and an edge enabler client (or MEC enabling layer (MEL)) 2316. The user equipment 2000 may perform a required operation by using the edge enabler client 2316 to use an MEC service. A detailed description of the edge enabler client 2316 will be described later.

According to an embodiment, the user equipment 2000 may execute a plurality of applications. For example, the user equipment 2000 may execute the first application client 2312 and the second application client 2314. A plurality of applications may require different network services from each other based on at least one of a required data transmission rate, a latency (or delay rate), reliability, the number of user equipments accessing a network, a network access period or an average data usage of the user equipment 2000. The different network services may include, for example, enhanced mobile broadband (eMBB), ultra-reliable and low latency communication (URLLC), or massive machine type communication (mMTC).

An application client of the user equipment 2000 may refer to a basic application pre-installed in the user equipment 2000 or an application provided by a third party. That is, the application client of the user equipment 2000 may refer to a client application program that is run in the user equipment 2000 for a certain application service. Several application clients may be run in the user equipment 2000. At least one of these application clients may use a service provided from the edge data network 1000. For example, the application client may be an application installed and executed in the user equipment 2000, and may provide a function of transmitting and receiving data through the edge data network 1000. The application client of the user equipment 2000 may refer to application software running on the user equipment 2000 in order to use a function provided by one or more certain edge applications.

According to an embodiment, the plurality of applications 2312 and 2314 of the user equipment 2000 may perform data transmission with the remote server 3000 based on a required network service type, or data transmission with the edge data network 1000 based on edge computing. For example, when the first application client 2312 does not request a low latency, the first application client 2312 may perform data transmission with the remote server 3000. As another example, when the second application client 2314 requests a low latency, the second application client 2314 may perform MEC-based data transmission with the edge data network 1000.

According to an embodiment, an application of the user equipment 2000 may be referred to as an application client, a client application (Client App), or a UE application (UE App). For convenience, hereinafter, in the disclosure, an application of the user equipment 2000 is referred to as an application client.

According to an embodiment, the remote server 3000 may provide content related to an application. For example, the remote server 3000 may be managed by a content provider. According to an embodiment, the remote server 3000 may transmit or receive data to or from the user equipment 2000 via an external data network (DN) (e.g., the Internet).

Although not illustrated in FIG. 1, a core network (CN) and a data network (DN) may exist between the access network 4000 and the edge data network 1000. According to an embodiment, the data network may provide a service (e.g., an Internet service, IP multimedia subsystem (IMS) service) by transmitting or receiving data (or data packets) to and from the user equipment 2000 via a core network and the access network 4000. For example, the data network may be managed by a communication provider. In an embodiment, the edge data network 1000 may be connected to the access network 4000 or a core network through a data network (e.g., a local DN).

Figure 2:
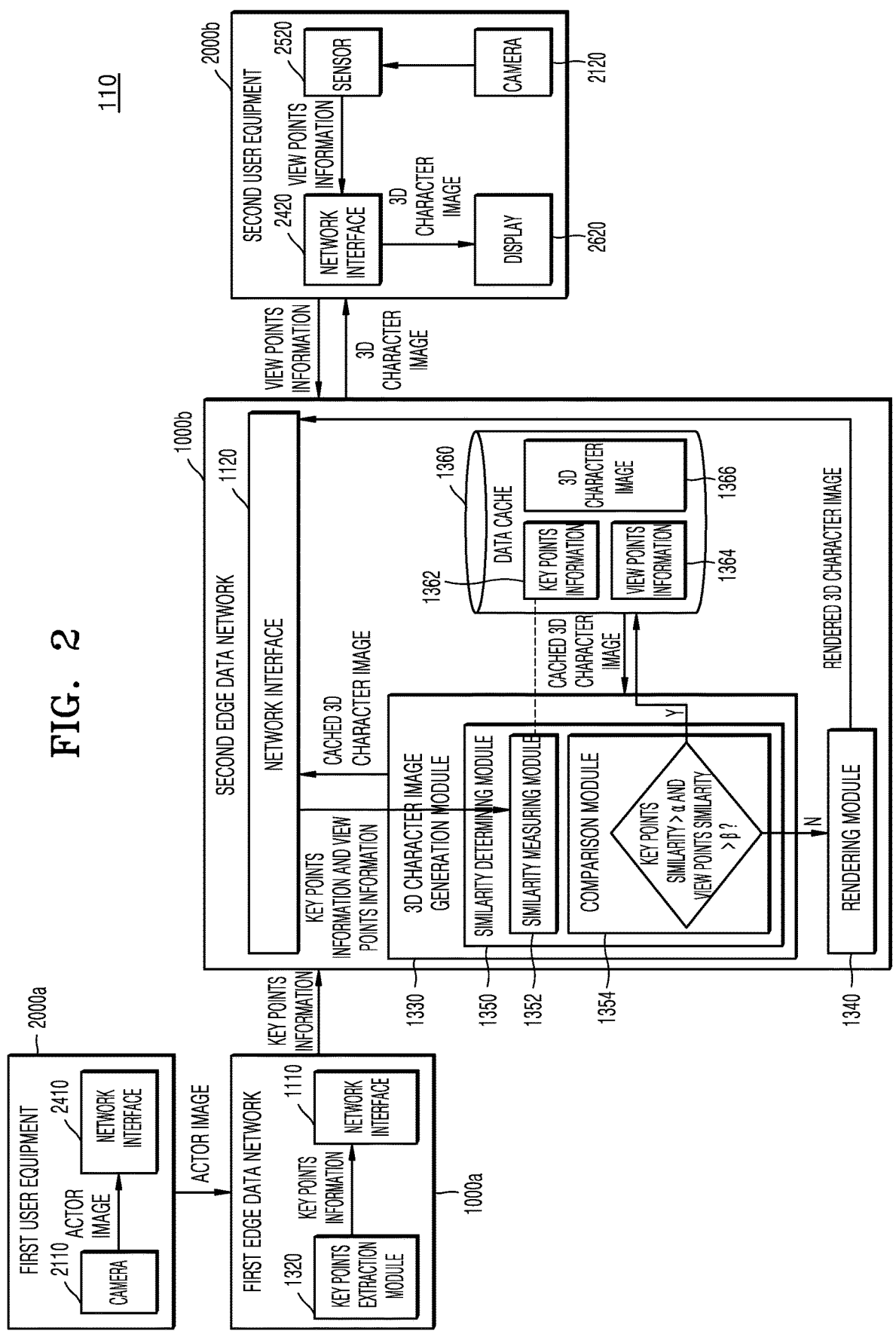
FIG. 2 is a diagram for describing a structure of modules of each of an edge data network and a user equipment and data transmission and reception therein, according to an embodiment of the disclosure.

FIG. 2 is a schematic view for describing an operation procedure between edge data networks and user equipments in a network environment, according to an embodiment of the disclosure.

Referring to FIG. 2, network environment 110 may include a first edge data network 1000*a*, a second edge data network 1000*b*, a first user equipment 2000*a*, and a second user equipment 2000*b*. However, configurations of the network environment 110 are not limited to those illustrated in FIG. 2. According to an embodiment of the disclosure, each component included in the network environment 110 may refer to a physical entity unit or a software or module unit capable of performing individual functions.

The first user equipment 2000*a* and the second user equipment 2000*b* may perform communication via the first edge data network 1000*a* and the second edge data network 1000*b*. For example, the first user equipment 2000*a* and the second user equipment 2000*b* may conduct a teleconference, make a video call, or deliver an online lecture via the first edge data network 1000*a* and the second edge data network 1000*b*.

In an embodiment, when the first user equipment 2000*a* and the second user equipment 2000*b* conduct a teleconference, the first user equipment 2000*a* may be a user equipment used by a first user performing a motion or action, and the second user equipment 2000*b* may be a user equipment that displays a three-dimensional (3D) character image showing the appearance, motion, or action of the first user. A second user may view a 3D character image of the first user via the second user equipment 2000*b*. In this case, the first user equipment 2000*a* may be an actor device, and the second user equipment 2000*b* may be a viewer device. However, the disclosure is not limited thereto.

The first user equipment 2000*a* may include a camera 2110 and a network interface 2410. FIG. 1 illustrates only some components of the first user equipment 2000*a*, and the first user equipment 2000*a* includes not only the camera 2110 and the network interface 2410.

The first user equipment 2000*a* may execute, for example, an application client capable of conducting a teleconference. In this case, the application client executed by the first user equipment 2000*a* may be a teleconferencing application to which the first edge data network 1000*a* and the second edge data network 1000*b* may provide a service. By executing the application client, the first user equipment 2000*a* may capture an image of the first user by using the camera 2110 and obtain an actor image. The first user equipment 2000*a* may provide the actor image obtained using the camera 2110 to the network interface 2410.

The first user equipment 2000*a* may transmit the actor image to the first edge data network 1000*a* by using the network interface 2410. In an embodiment, the first user equipment 2000*a* may film a moving picture or video related to the appearance, action, or motion, of the first user and sequentially transmit a plurality of actor images included in the filmed moving picture or video to the first edge data network 1000*a*. In an embodiment, the first user equipment 2000*a* may transmit, to the first edge data network 1000*a*, together with an actor image, at least one of user equipment identification information of the first user equipment 2000*a* (e.g., device id), identification information of the first user (e.g., user id), information of an application client that is running, and identification information of a teleconference room (e.g., conference room location information, conference room identification number, etc.).

The first edge data network 1000*a* may receive an actor image from the first user equipment 2000*a*, and extract feature coordinate values of a plurality of feature points from the actor image by using a key points extraction module 1320. The 'plurality of feature points' may be points indicating features related to the body parts, posture, or skeletal structure of the first user in the actor image. The plurality of feature points may be extracted from, for example, features of body parts or the skeletal structure such as a face, shoulders, arms, thighs, and calves of a human body.

The key points extraction module 1320 is a module configured to extract a plurality of feature points from an actor image by using a feature point extraction algorithm and output key points information including the plurality of feature points. The key points extraction module 1320 may extract a plurality of feature points from an actor image by using, for example, a feature point extraction algorithm such as Scale Invariant Feature Transform (SIFT), Features from Accelerated Segment Test (FAST), Adaptive and Generic corner detection based on the Accelerated Segment Test (AGAST), or Binary robust independent elementary features (Brief) or by using machine learning. The 'key points information' may include information about a plurality of three-dimensional position coordinate values of each of the plurality of extracted feature points.

The key points extraction module 1320 may provide key points information including information on a plurality of feature points to a network interface 1110.

The first edge data network 1000*a* transmits key points information to the second edge data network 1000*b* by using the network interface 1110.

The second user equipment 2000*b* obtains view points information. The 'view points information' is information about a virtual view point from which a 3D character image displayed through a display 2620 of the second user equipment 2000*b* is viewed via a virtual camera in a three-dimensional virtual space. The view points information may include virtual position coordinate value information indicating a position and direction in which a virtual camera views a 3D character image.

In an embodiment, the second user equipment 2000*b* may capture images of a second user, a wall of a conference room where the second user is located, or an object, by using the camera 2120, and may link a position of the second user with a three-dimensional virtual space by using the captured images and sensing information obtained using a sensor 2520. For example, the second user equipment 2000*b* may map a three-dimensional virtual space with location information of a real location by using the Simultaneous Localization And Mapping (SLAM) technique and set a position of a 3D character image (e.g., an Avatar image) mapped with the user's location.

The sensor 2520 may include, for example, at least one of a global positioning system (GPS) sensor, a gyroscope sensor, an acceleration sensor, and an inertia measurement unit (IMU). In an embodiment, the second user equipment 2000*b* may obtain view points information by calculating three-dimensional position coordinate values based on a position of the second user and a position of the 3D character image based on the sensing information obtained using the sensor 2520.

The second user equipment 2000*b* transmits the obtained view points information to the second edge data network 1000*b* via a network interface 2420. In an embodiment, the second user equipment 2000*b* may transmit other information along with the view points information to the second edge data network 1000*b*. For example, the second user equipment 2000*b* may transmit, to the second edge data network 1000*b* at least one of user equipment identification information of the second user equipment 2000*b* (e.g., device id), identification information of the second user (e.g., user id), information of an application client that is run by the second user equipment 2000*b*, and identification information of a teleconference room (e.g., conference room location information, conference room identification number, etc.).

Referring to FIG. 2, the second user equipment 2000*b* is illustrated as transmitting view points information to the second edge data network 1000*b* by using the network interface 2420, but the embodiment of the disclosure is limited thereto. According to another embodiment, the second user equipment 2000*b* may transmit, to the second edge data network 1000*b*, an image obtained by capturing an image of the second user by using the camera 2120 and sensing information obtained through the sensor 2520. In this case, the second edge data network 1000*b* may obtain view points information from the image and the sensing information received from the second user equipment 2000*b*. For example, the second edge data network 1000*b* may obtain view points information from an image and sensing information by using the SLAM technique.

The second edge data network 1000*b* may include a network interface 1120, a 3D character image generation module 1330, and a data cache 1360. However, components included in the second edge data network 1000*b* are not limited to those illustrated in FIG. 2.

The second edge data network 1000*b* may receive key points information from the first user equipment 2000*a* and view points information from the second user equipment 2000*b* via the network interface 1120. The network interface 1120 provides the key points information and the view points information to the 3D character image generation module 1330.

The 3D character image generation module 1330 is a module configured to generate a 3D character image representing the first user's appearance, action or motion based on the key points information and the view points information. Here, a '3D character image' may be an Avatar image composed of a three-dimensional image, a cartoon character image, or an emoticon image. The 3D character image generation module 1330 may include a rendering module 1340 and a similarity determining module 1350.

The rendering module 1340 is a module configured to render a 3D character image by using the key points information received from the first edge data network 1000*a* and the view points information received from the second user equipment 2000*b*. In an embodiment, the rendering module 1340 may render a 3D character image of a preset size by resizing and adjusting a scale of a plurality of feature coordinate values included in the key points information. In an embodiment, the rendering module 1340 may determine a position and direction in which a 3D character image is displayed based on virtual view points information for viewing the 3D character image, included in the view points information, and render the 3D character image to be displayed according to the determined position and direction.

In an embodiment, the rendering module 1340 may store the rendered 3D character image in the data cache 1360.

The data cache 1360 is a buffer memory included in the second edge data network 1000*b*. The data cache 1360 may store key points information 1362, view points information 1364, and a 3D character image 1366 in the form of caching. 'Caching' refer to a technique of previously obtaining data from a data providing apparatus (e.g., a user equipment or an edge data network) and storing the data. In an embodiment, the data cache 1360 may store the key points information 1362, the view points information 1364, and the 3D character image 1366 as a key-value type. That is, the 3D character image 1366 stored in the data cache 1360 may be a value, and may be an image generated based on keys included in the key points information 1362 and the view points information 1364.

The data cache 1360 may classify view points information according to a preset number of logical indexes and store the same. For example, the data cache 1360 may classify data included in view points information into twelve or 27 logical indexes and store the data by normalizing the classified logical indexes.

In an embodiment, the data cache 1360 may remove data that has not been used for the longest time and store newly input data, according to LRU policy (Least Recently Used policy).

The similarity determining module 1350 is a module configured to measure a key points similarity and a view points similarity by comparing the key points information 1362 and the view points information 1364 that are previously stored in the data cache 1360 with key points information received from the first edge data network 1000*a* and view points information received from the second user equipment 2000*b*, respectively, and determine whether to provide a cached 3D character image to the second user equipment 2000*b*. The similarity determining module 1350 may include a similarity measuring module 1352 and a comparison module 1354.

The similarity measuring module 1352 is a module configured to measure a key points similarity and a view points similarity by comparing key points information received from the first edge data network 1000*a* and view points information received from the second user equipment 2000*b* with the key points information 1362 and the view points information 1364 previously stored in the data cache 1360, respectively. In an embodiment, the similarity measuring module 1352 may measure a key points similarity among a plurality of feature coordinate values respectively included in the key points information received from the first edge data network 1000*a* and the key points information 1362 previously stored in the data cache 1360 by using a Euclidean distance or a Cosine similarity measurement method. In an embodiment, the similarity measuring module 1352 may measure a view points similarity by comparing numerical values included in the view points information received from the second user equipment 2000*b* with numerical values included in the view points information 1364 stored in the data cache 1360.

The comparison module 1354 is a module configured to compare a key points similarity and a view points similarity measured using the similarity measuring module 1352 with a preset threshold. The comparison module 1354 may compare a key points similarity with a preset first threshold $\alpha$ and a view points similarity with a preset second threshold $\beta$, respectively.

In an embodiment, when a key points similarity is greater than the first threshold $\alpha$, and a view points similarity is greater than the second threshold $\beta$, the comparison module 1354 may determine that the received key points information is similar to the key points information 1362 previously stored in the data cache 1360, and the received view points information is similar to the view points information 1364 previously stored in the data cache 1360. In this case, the comparison module 1354 may access the data cache 1360 to identify the 3D character image 1366 cached in the data cache 1360 in association with the key points information 1362 and the view points information 1364. The 3D character image generation module 1330 may read out the identified 3D character image 1366 and provide the read-out 3D character image 1366 to the network interface 1120. The second edge data network 1000*b* may transmit the 3D character image to the second user equipment 2000*b* by using the network interface 1120.

In an embodiment, when a key points similarity is equal to or less than the first threshold $\alpha$ or a view points similarity is equal to or less than the second threshold $\beta$, the comparison module 1354 may determine that the received key points information is not similar to the key points information 1362 previously stored in the data cache 1360 and the received view points information is not similar to the view points information 1364 previously stored in the data cache 1360. In this case, the comparison module 1354 may provide the key points information received from the first edge data network 1000*a* and the view points information received from the second user equipment 2000*b*, to the rendering module 1340. The rendering module 1340 may render the 3D character image by using the key points information and view points information provided. The second edge data network 1000*b* may transmit the rendered 3D character image to the second user equipment 2000*b* by using the network interface 1120.

The second user equipment 2000*b* may receive the 3D character image from the second edge data network 1000*b* via the network interface 2420 and display the received 3D character image on the display 2620.

In an Augmented Reality Telepresence via the first user equipment 2000*a* and the second user equipment 2000*b*, 3D character images showing the appearance, action or motion of the first user may be displayed via the display 2620 of the second user equipment 2000*b*. In a general meeting, humans' motion is not frequent and not large, and in many cases, certain actions are frequently repeated. In an augmented reality telepresence according to the related art, an edge data network generates 3D character images by repeatedly performing rendering on all image frames based on key points information extracted from an actor image obtained through photographing using the camera 2110 of the first user equipment 2000*a* and view points related to view points from which a second user views the second user equipment 2000*b*, and thus, due to repetitive rendering processing, a large amount of computing power is consumed and the processing time thereof is long.

In an embodiment of the disclosure, the second edge data network 1000*b* compares key points information obtained from the first edge data network 1000*a* and view points information obtained from the second user equipment 2000*b* with the key points information 1362 and the view points information 1364 stored in the data cache 1360, respectively, measure a key points similarity and a view points similarity, and when the measured key points similarity and the measured view points similarity are greater than a preset threshold, the second edge data network 1000*b* does not perform rendering but reads out and provides the cached 3D character image 1366 to the second user equipment 2000*b*, thereby preventing repetitive rendering. Accordingly, the second edge data network 1000*b* according to the disclosure may save computing power and shorten the processing time.

In addition, in an embodiment of the disclosure, the first user equipment 2000*a* may transmit or receive data to or from the first edge data network 1000*a* arranged at a geographically adjacent location thereto, and the second user equipment 2000*b* may transmit or receive data to or from the second edge data network 1000*b* arranged at a geographically adjacent location thereto, and thus, the first user equipment 2000*a* and the second user equipment 2000*b* may transmit or receive data to or from each other by using an MEC method and without going through an external data network. In particular, a relatively large file such as an actor image is transmitted between the first user equipment 2000*a* and the first edge data network 1000*a* that are geographically adjacent to each other, and a relatively small file such as key points information is transmitted between the first edge data network 1000*a* and the second edge data network 1000*b* that are geographically distant from each other, and thus, data may be efficiently transmitted and the burden in terms of the cost for using a network may also be reduced. In the network environment 110 according to an embodiment of the disclosure, compared to a case where the first user equipment 2000*a* and the second user equipment 2000*b* transmit or receive data to or from a cloud server by using an external data network (e.g., an Internet network), the latency may be reduced and the processing speed may be shortened, and accordingly, an application client such as a teleconference may be realized in real time.

Figure 3:
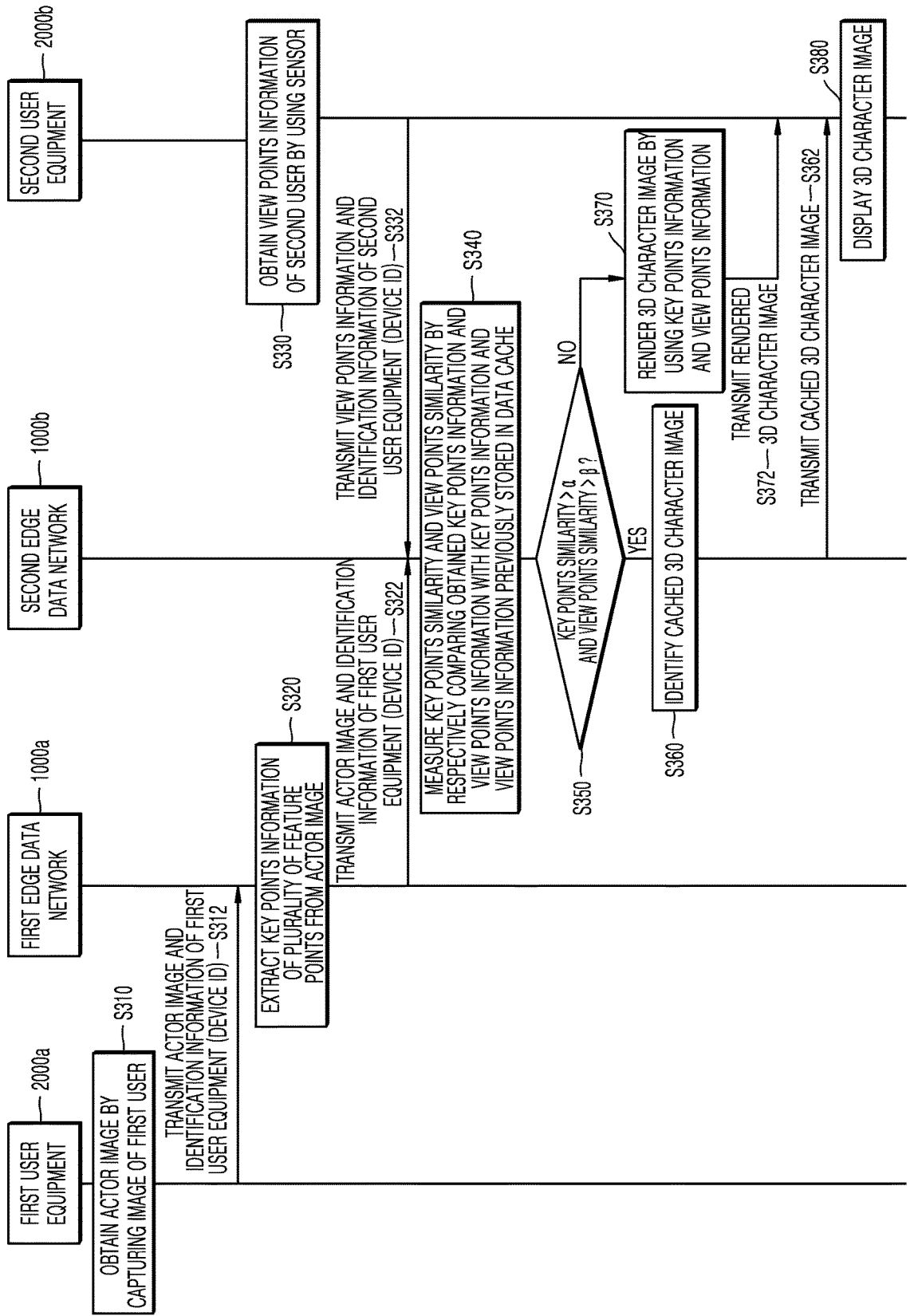
FIG. 3 is a diagram for describing an operating method between an edge data network and a user equipment, according to an embodiment of the disclosure.

FIG. 3 is a diagram for describing an operating method between edge data networks and the user equipments according to an embodiment of the disclosure.

Referring to FIG. 3, in operation S310, a first user equipment 2000*a* may obtain an actor image by capturing an image of the first user. In an embodiment, the first user equipment 2000*a* may execute an application client, and may film a moving picture or video of the appearance, action or motion of the first user by using a camera, and obtain a plurality of actor images included in the filmed moving picture or video.

In operation S312, the first user equipment 2000*a* transmits the actor image and identification information of the first user equipment 2000*a* (e.g., device id) to the first edge data network 1000*a*. In an embodiment, the first user equipment 2000*a* may sequentially transmit a plurality of actor images to the first edge data network 1000*a*. In an embodiment, the first user equipment 2000*a* may transmit, to the first edge data network 1000*a*, not only a plurality of actor images and user equipment identification information of the first user equipment 2000*a*, but also information about at least one of identification information of the first user (e.g., user id), information of an application client that is run by the first user equipment 2000*a*, and identification information of a teleconference room (e.g., conference room location information, conference room identification number, etc.).

In operation S320, the first edge data network 1000a extracts key points information of a plurality of feature points from the actor image. The 'plurality of feature points' may be points indicating features related to the body parts, posture, or skeletal structure of the first user in the actor image. The plurality of feature points may be extracted from, for example, features of body parts such as a face, shoulders, arms, thighs, and calves of a human body or features of the skeletal structure. The first edge data network 1000a may extract a plurality of feature points from an actor image by using a feature point extraction algorithm and output key points information including the plurality of feature points. The first edge data network 1000a may extract a plurality of feature points from an actor image by using, for example, a feature point extraction algorithm such as Scale Invariant Feature Transform (SIFT), Features from Accelerated Segment Test (FAST), Adaptive and Generic corner detection based on the Accelerated Segment Test), or Binary robust independent elementary features (Brief) or by using machine learning. The 'key points information' may include information about a plurality of three-dimensional position coordinate values of each of the plurality of extracted feature points.

In operation S322, the first edge data network 1000a transmits the key points information and identification information of the first user equipment 2000a (e.g., device id) to the second edge data network 1000b. In an embodiment, the first edge data network 1000a may transmit, to the second edge data network 1000b, at least one of identification information of the first user, information of an application client run by the first user equipment, and information about a teleconference room.

In operation S330, the second user equipment 2000b obtains view points information of the second user by using a sensor. The 'view points information' is information about a virtual view point from which a 3D character image (e.g., an Avatar image) displayed by the second user equipment 2000b is viewed via a virtual camera in a three-dimensional virtual space. The view points information may include virtual position coordinate value information indicating a position and direction in which a virtual camera views a 3D character image.

In an embodiment, the second user equipment 2000b may capture images of the second user, a wall of a conference room where the second user is located, or an object, by using a camera, and may link a position of the second user with a three-dimensional virtual space by using the captured images and sensing information obtained using a sensor. For example, the second user equipment 2000b may map a three-dimensional virtual space with location information of a real location by using the SLAM technique and set a position of a 3D character image (e.g., an Avatar image) mapped with the user's location. The sensing information refers to information obtained by sensing performed by using at least one of, for example, a GPS sensor, a gyroscope sensor, an acceleration sensor, and an inertia measurement unit (IMU). In an embodiment, the second user equipment 2000b may obtain view points information by calculating three-dimensional position coordinate values with respect to a position of the second user and a position of a 3D character image based on the sensing information.

In operation S332, the second user equipment 2000b transmits the view points information and identification information of the second user equipment 2000b (e.g., device id) to the second edge data network 1000b. In an embodiment, the second user equipment 2000b may transmit, to the second edge data network 1000b, not only the view points information and the identification information of the second user equipment 2000b, but also information about at least one of identification information of the second user (e.g., user id), information of an application client that is run by the second user equipment 2000b, and identification information of a teleconference room (e.g., conference room location information, conference room identification number, etc.).

While operation S322 and operation S332 are illustrated to be temporally simultaneously performed, this is an example, and the disclosure is not limited thereto. For example, operation S322 may be performed before operation S332, or operation S332 may be performed before operation S322. That is, the second edge data network 1000b may receive key points information from the first edge data network 1000a first or receive view points information from the second user equipment 2000b first. In this case, the second edge data network 1000b may temporarily store data received earlier, from among key points information and view points information, in a Request Queue. In an embodiment, by temporarily storing the key points information and the view points information in a Request Queue, even when the key points information and the view points information are received at different points in time, the second edge data network 1000b may synchronize the key points information and the view points information with each other.

In operation S340, the second edge data network 1000b may measure a key points similarity and a view points similarity by respectively comparing the obtained key points information and view points information with key points information and view points information that are previously stored in a data cache. The second edge data network 1000b may include a data cache configured with a buffer memory that is caching key points information and view points information. 'Caching' refer to a technique of obtaining data previously from a data providing apparatus (e.g., a user equipment or an edge data network) and storing the data. In an embodiment, in a data cache, key points information, view points information, and a 3D character image may be stored as a key-value type. Here, a '3D character image' may be an Avatar image composed of a three-dimensional image, a cartoon character image, or an emoticon image.

The second edge data network 1000b may measure a key points similarity and a view points similarity by respectively comparing key points information and view points information cached in a data cache with key points information obtained from the first edge data network 1000a and view points information obtained from the second user equipment 2000b. For example, the second edge data network 1000b may measure a similarity between the key points information received from the first edge data network 1000a and key points information cached in a data cache by using a Euclidean distance or a Cosine similarity measurement method. In an embodiment, the second edge data network 1000b may measure a similarity between a numerical value included in the view points information received from the second user equipment 2000b and a numerical value included in view points information cached in a data cache.

In operation S350, the second edge data network 1000b compares the measured key points similarity with the preset first threshold $\alpha$, and the measured view points similarity with the preset second threshold $\beta$.

As a result of the comparison, when the key points similarity is greater than the first threshold $\alpha$ and the view points similarity is greater than the second threshold β in operation S360, the second edge data network 1000b identifies the cached 3D character image from the data cache. In operation S360, the second edge data network 1000b may determine that the key points information obtained from the first edge data network 1000a is similar to the key points information cached in the data cache, and the view points information obtained from the second user equipment 2000b is similar to the view points information cached in the data cache. In this case, the second edge data network 1000b may access the data cache to identify a 3D character image that is cached in association with the key points information and the view points information among a plurality of cached 3D character images.

In operation S362, the second edge data network 1000b transmits the cached 3D character image to the second user equipment 2000b. In an embodiment, the second edge data network 1000b may read out the 3D character image identified in operation S360 from the data cache, and transmit the read out 3D character image to the second user equipment 2000b.

As a result of the comparison, when the key points similarity is equal to or less than the first threshold α, or the view points similarity is equal to or less than the second threshold β in operation S370, the second edge data network 1000b renders the 3D character image by using the key points information and the view points information. In operation S370, the second edge data network 1000b may determine that the key points information obtained from the first edge data network 1000a is not similar to the key points information cached in the data cache, and the view points information obtained from the second user equipment 2000b is not similar to the view points information cached in the data cache. In this case, the second edge data network 1000b may render the 3D character image by using the key points information obtained from the first edge data network 1000a and the view points information obtained from the second user equipment 2000b.

In operation S372, the second edge data network 1000b transmits the rendered 3D character image to the second user equipment 2000b.

In operation S380, the second user equipment 2000b displays the 3D character image.

Figure 4:
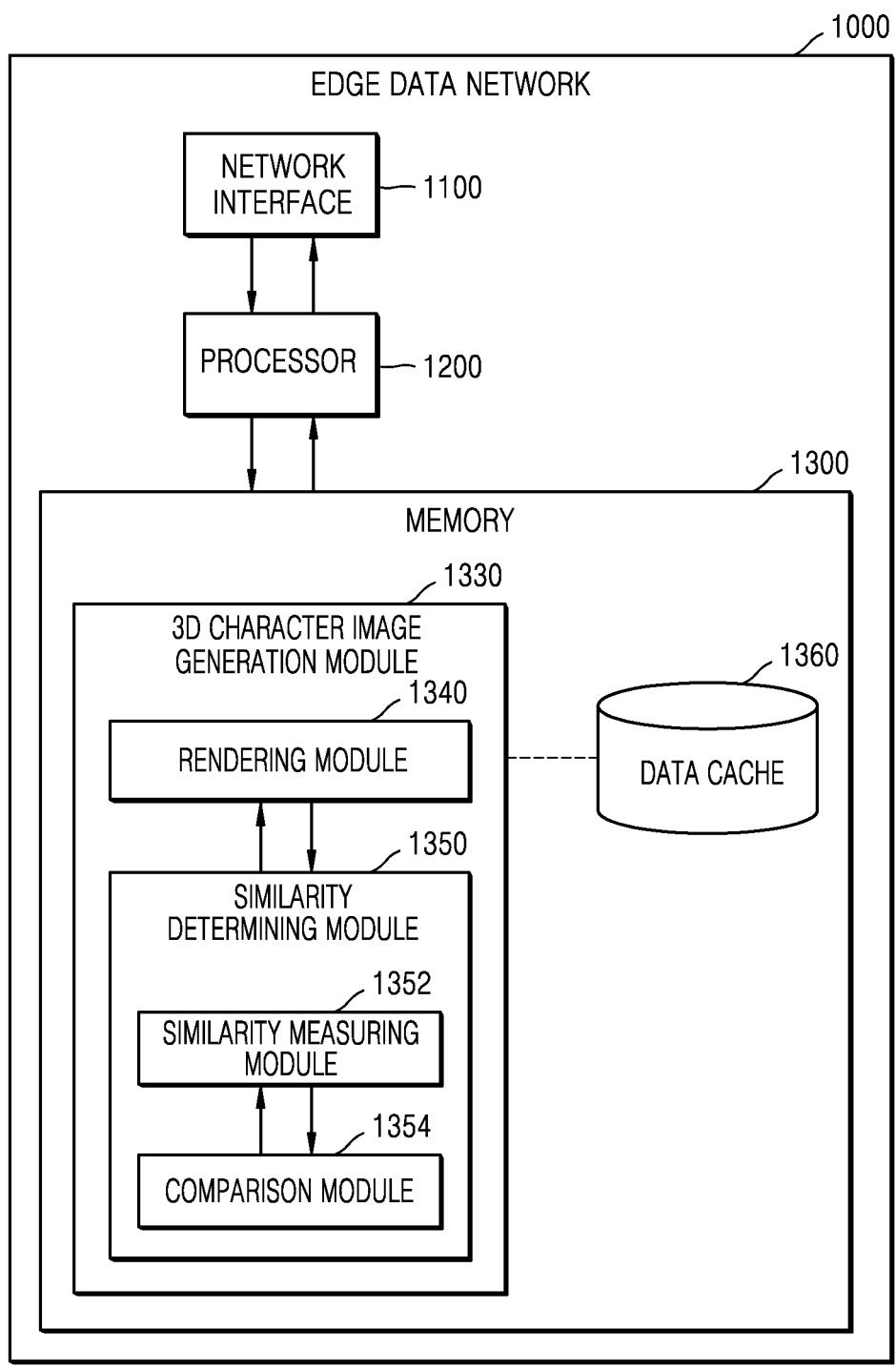
FIG. 4 is a block diagram illustrating components of an edge data network according to an embodiment of the disclosure.

FIG. 4 is a block diagram illustrating components of an edge data network according to an embodiment of the disclosure.

Referring to FIG. 4, an edge data network 1000 may include a network interface 1100, a processor 1200, and a memory 1300. However, components of the edge data network 1000 are not limited to those illustrated in FIG. 4. For example, the edge data network 1000 may include more components or fewer components than illustrated ones. Furthermore, the network interface 1100, the processor 1200, and the memory 1300 may be implemented in the form of a single chip.

The network interface 1100 may transmit or receive a signal to or from an external device, for example, a user equipment, an access network, a remote server, or a 3GPP network. A signal transmitted or received to or from an external device may include control information and data. The network interface 1100 may include an RF transmitter for up-converting and amplifying a frequency of a transmitted signal, and an RF receiver for performing low-noise amplification on a received signal and down-converting a frequency of the received signal. However, the network interface 1100 is not limited to the above-described examples. The network interface 1100 may transmit or receive a signal to or from an external device by using at least one of wireless data communication methods including Wireless Local Area Network (LAN), Wi-Fi, Wi-Fi Direct (WFD), and Wireless Gigabit Alliance (WiGig). The network interface 1100 may output a received signal to the processor 1200 and transmit a signal output from the processor 1200 to an external device.

Although not illustrated in the drawings, the network interface 1100 may include a first network interface configured to transmit or receive data to or from another edge data network (e.g., the first edge data network 1000a, see FIG. 2) and a second network interface configured to transmit or receive data to or from a user equipment (e.g., the second user equipment 2000b (see FIG. 2)).

The network interface 1100 may receive key points information and view points information from an external device through the control by the processor 1200. In an embodiment, the first network interface included in the network interface 1100 may receive key points information of the first user from the first edge data network 1000a (refer to FIG. 2). The 'key points information' may include a plurality of three-dimensional position coordinate values about a plurality of feature points representing characteristics of the body parts, posture, or skeletal structure of the first user, extracted from an actor image photographed through the first user equipment 2000a (see FIG. 2). In an embodiment, the network interface 1100 may receive, from the first user equipment 2000a, at least one of identification information of a user equipment (e.g., device id), user identification information of the first user, and information of an application client that is running (e.g., conference room location information, conference room identification number, etc.).

The second network interface included in the network interface 1100 may receive view points information from the second user equipment 2000b (see FIG. 2). The 'view points information' may include information on virtual position coordinate values regarding virtual view points of a 3D character image displayed via the second user equipment 2000b. In an embodiment, the network interface 1100 may receive, from the second user equipment 2000b, at least one of identification information of a user equipment (e.g., device id), user identification information of the second user, and information of an application client that is running (e.g., conference room location information, conference room identification number, etc.).

The processor 1200 may execute one or more instructions of a program stored in the memory 1300. The processor 1200 may be composed of hardware components that perform arithmetic, logic, and input/output operations and signal processing. The processor 1200 may be composed of at least one of, for example, a central processing unit, a microprocessor, a Neural Processor Unit (NPU), a graphics processor Graphic Processing Unit (GPU), Application Specific Integrated Circuits (ASICs), Digital Signal Processors (DSPs), Digital Signal Processing Devices (DSPDs), Programmable Logic Devices (PLDs), and Field Programmable Gate Arrays (FPGAs), but is not limited thereto.

The memory 1300 may be composed of at least one of, for example, a flash memory type, a hard disk type, a multimedia card micro type, a card type memory (e.g., secure digital (SD) or extreme digital (XD) memory, etc.), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk.

The memory 1300 may be stored with a program including instructions related to performance of functions or operations of obtaining key points information and view points information, measuring a similarity between the obtained key points information and view points information and the key points information and view points information previously stored in the data cache 1360, reading out a 3D character image cached in the data cache 1360 based on the measured similarity and providing the 3D character image to the second user equipment 2000b (see FIG. 2). The memory 1300 may store at least one of instructions, algorithms, data structures, and program code, readable by the processor 1200. The instructions, algorithms, data structures, and program code stored in the memory 1300 may be implemented in, for example, programming or scripting languages such as C, C++, Java, assembler, or the like.

In an embodiment, the memory 1300 may store software including an operating system (OS), middleware, or an application client. In an embodiment, the first application client (e.g., first edge application 1312) and the second application client (e.g., second edge application 1314) illustrated in FIG. 1 may be stored in the memory 1300.

In the embodiments below, the processor 1200 may be implemented by executing instructions or program codes of a program stored in a memory.

The memory 1300 may include the 3D character image generation module 1330 and the data cache 1360. The 3D character image generation module 1330 may include a rendering module 1340 and a similarity determining module 1350. A plurality of 'modules' included in the memory 1300 refer to units for processing a function or operation performed by the processor 1200, which may be implemented in software such as instructions or program code.

The 3D character image generation module 1330 is a module configured to generate a 3D character image showing the appearance, action, or motion of the first user, obtained through the first user equipment 2000a (see FIG. 2) based on key points information and view points information. Here, a '3D character image' may be an Avatar image composed of a three-dimensional image, a cartoon character image, or an emoticon image. The 3D character image generation module 1330 may include a rendering module 1340 and a similarity determining module 1350.

The rendering module 1340 is a module configured to render a 3D character image showing the appearance, action, or motion of the first user, based on key points information and view points information received through the network interface 1100. In an embodiment, the processor 1200 may render a 3D character image of a preset size by resizing and adjusting a scale of a plurality of feature coordinate values included in key points information by using data or program code related to the rendering module 1340.

The processor 1200 may determine a position and direction in which a 3D character is displayed based on virtual view points information for viewing the 3D character image, wherein the virtual view points information is included in the view points information. In an embodiment, the processor 1200 may classify data related to the virtual view points information included in the view points information into a preset number of logical indexes, and determine a position and direction in which a 3D character is displayed according to the classified logical indexes. In an embodiment, the processor 1200 may render, by using the data or program code of the rendering module 1340, the 3D character image so that the 3D character image is displayed according to the determined position and direction.

In an embodiment, the processor 1200 may render a 3D character image based on user identification information of the first user received via the network interface 1100. For example, the processor 1200 may classify at least one previously generated 3D character image according to user identification information and store the same in a storage unit (not shown) in the memory 1300, and may select a 3D character image corresponding to the first user from among the stored at least one 3D character image based on the user identification information of the first user. The processor 1200 may render a 3D character image according to the received key points information and view points information by using the selected 3D character image.

The processor 1200 may store the rendered 3D character image in the data cache 1360.

The data cache 1360 is a buffer memory that temporarily stores instructions or data read by the processor 1200, and may be configured as non-volatile memory. The data cache 1360 may include at least one nonvolatile memory from among, for example, a flash memory type, a hard disk type, a multimedia card micro type, and a card type memory (e.g., SD or XD memory, etc.), a magnetic memory, a magnetic disk, and an optical disk. However, the disclosure is not limited thereto.

The processor 1200 may store the rendered 3D character image and the key points information and the view points information used in rendering the 3D character image, in the data cache 1360. In an embodiment, the processor 1200 may store the key points information 1362, the view points information 1364, and the 3D character image 1366 in the data cache 1360 as a key-value type. That is, the 3D character image stored in the data cache 1360 may be a value, and may be an image generated based on key points information and view points information.

In an embodiment, the processor 1200 may store, in the data cache 1360 in units of image frames, a plurality of 3D character images generated by rendering by using a plurality of pieces of key points information received from the first edge data network 1000a (see FIG. 2) and a plurality of view points received from the second user equipment 2000b (see FIG. 2). For example, the processor 1200 may store, in the data cache 1360, a first 3D character image rendered using first key points information and first view points information as a first index and a second 3D character image rendered using second key points information and second view points information as a second index.

In an embodiment, the processor 1200 may store, together with a rendered 3D character image in the data cache 1360, at least one of user identification information of the first user, a plurality of pieces of previously obtained key points information regarding the appearance, actions conducted in the past, motions, postures or directions of the first user, priority information for determining a key points similarity, and information about a teleconference type.

In an embodiment, the processor 1200 may remove data that has long been not used for the longest time, by using Least Recently Used (LRU) policy and store newly input data in the data cache 1360.

The similarity determining module 1350 is a module configured to measure a key points similarity and a view points similarity by comparing the key points information and the view points information that are previously stored in the data cache 1360 with key points information received from the first edge data network 1000a and view points information received from the second user equipment 2000b (see FIG. 2), respectively, and determine a 3D character image to be provided to the second user equipment 2000b.

The similarity determining module 1350 may include a similarity measuring module 1352 and a comparison module 1354.

The similarity measuring module 1352 is a module configured to measure a key points similarity and a view points similarity by respectively comparing key points information received from the first edge data network 1000*a* and view points information received from the second user equipment 2000*b* with the key points information and the view points information previously stored in the data cache 1360. In an embodiment, the processor 1200 may measure a key points similarity among a plurality of feature coordinate values respectively included in key points information received from the first edge data network 1000*a* and key points information previously stored in the data cache 1360, by using data or program code related to the similarity measuring module 1352. In an embodiment, the processor 1200 may measure a view points similarity by comparing virtual position coordinate values included in view points information received from the second user equipment 2000*b* with virtual position coordinate values stored in the data cache 1360, by using data or program code related to the similarity measuring module 1352. In an embodiment, the processor 1200 may measure a key points similarity and a view points similarity by using a Euclidean distance or a Cosine similarity measurement method.

The processor 1200 may measure a key points similarity between input key points information and cached key points information by measuring a similarity between at least one feature coordinate value from among a plurality of first feature coordinate values included in key points information previously stored in the data cache 1360 and at least one feature coordinate value selected from among a plurality of feature coordinate values included in key points information input from the first edge data network 1000*a*. In an embodiment, the processor 1200 may measure a key points similarity by respectively calculating a difference value among a plurality of feature coordinate values respectively included in a plurality of pieces of key points information continuously input from the first edge data network 1000*a* according to the time flow, and comparing at least one feature coordinate value having a calculated difference value exceeding a preset threshold with a corresponding feature coordinate value from among a plurality of feature coordinate values cached in the data cache 1360. This will be described in further detail with reference to FIGS. 7 and 8.

The processor 1200 may select at least one second feature coordinate value extracted from a body part having a highest priority according to predetermined priorities, from among a plurality of second feature coordinate values included in key points information received from the first edge data network 1000*a*. Here, the 'priority' may be determined based on a degree and frequency of motion or movement of a body part of the first user in an augmented reality telepresence conducted via the edge data network 1000. In an embodiment, the priority may be determined based on a type of an augmented reality telepresence. For example, when an augmented reality telepresence is a business meeting, the degree of motion of the upper body parts such as arms, hands or facial expression among the body parts of the first user may be relatively large and the frequency thereof may be higher than the lower body parts. As another example, when an augmented reality telepresence is related to exercise, the degree and frequency of motions may be higher than those in a business meeting.

The processor 1200 may identify at least one first feature coordinate value corresponding to at least one feature coordinate value selected from among a plurality of first feature coordinate values included in key points information previously stored in the data cache 1360. In an embodiment, the processor 1200 may measure a similarity between the at least one first feature coordinate value and the at least one second feature coordinate value by using the similarity measuring module 1352. This will be described in further detail with reference to FIGS. 9 and 10.

The processor 1200 may reduce a computation amount by measuring a similarity of some feature coordinate values, instead of measuring similarity between all of a plurality of second feature coordinate values included in key points information obtained from the first edge data network 1000*a* and all of a plurality of first feature coordinate values included in key points information cached in the data cache 1360. Thus, the processor 1200 according to an embodiment of the disclosure may reduce computing power consumption and reduce the processing time.

The comparison module 1354 is a module configured to compare a key points similarity and a view points similarity measured using the similarity measuring module 1352 with a preset threshold. The processor 1200 may respectively compare a key points similarity with a preset first threshold and a view points similarity with a preset second threshold, by using data or program code related to the comparison module 1354.

In an embodiment, when a key points similarity exceeds the first threshold, and a view points similarity exceeds the second threshold, the processor 1200 may determine that the key points information received from the first edge data network 1000*a* is similar to key points information previously stored in the data cache 1360 and the view points information received from the second user equipment 2000*b* is similar to view points information previously stored in the data cache 1360. In this case, the processor 1200 may access the data cache 1360 to identify a 3D character image stored in association with the key points information and the view points information cached in the data cache 1360. The processor 1200 may read out the identified 3D character image from the data cache 1360 and transmit the read out 3D character image to the second user equipment 2000*b* via the network interface 1100.

When the key points similarity is equal to or less than the first threshold, or the view points similarity is less than or equal to the second threshold, the processor 1200 may determine that the key points information received from the first edge data network 1000*a* is not similar to the key points information cached in the data cache 1360, and the view points information received from the second user equipment 2000*b* is not similar to the view points information cached in the data cache 1360. In this case, the processor 1200 may provide the key points information received from the first edge data network 1000*a* and the view points information received from the second user equipment 2000*b* to the rendering module 1340. The processor 1200 may render a 3D character image by using the provided key points information and view points information, via the rendering module 1340. The processor 1200 may transmit the rendered 3D character image to the second user equipment 2000*b*, by using the network interface 1100.

Figure 5:
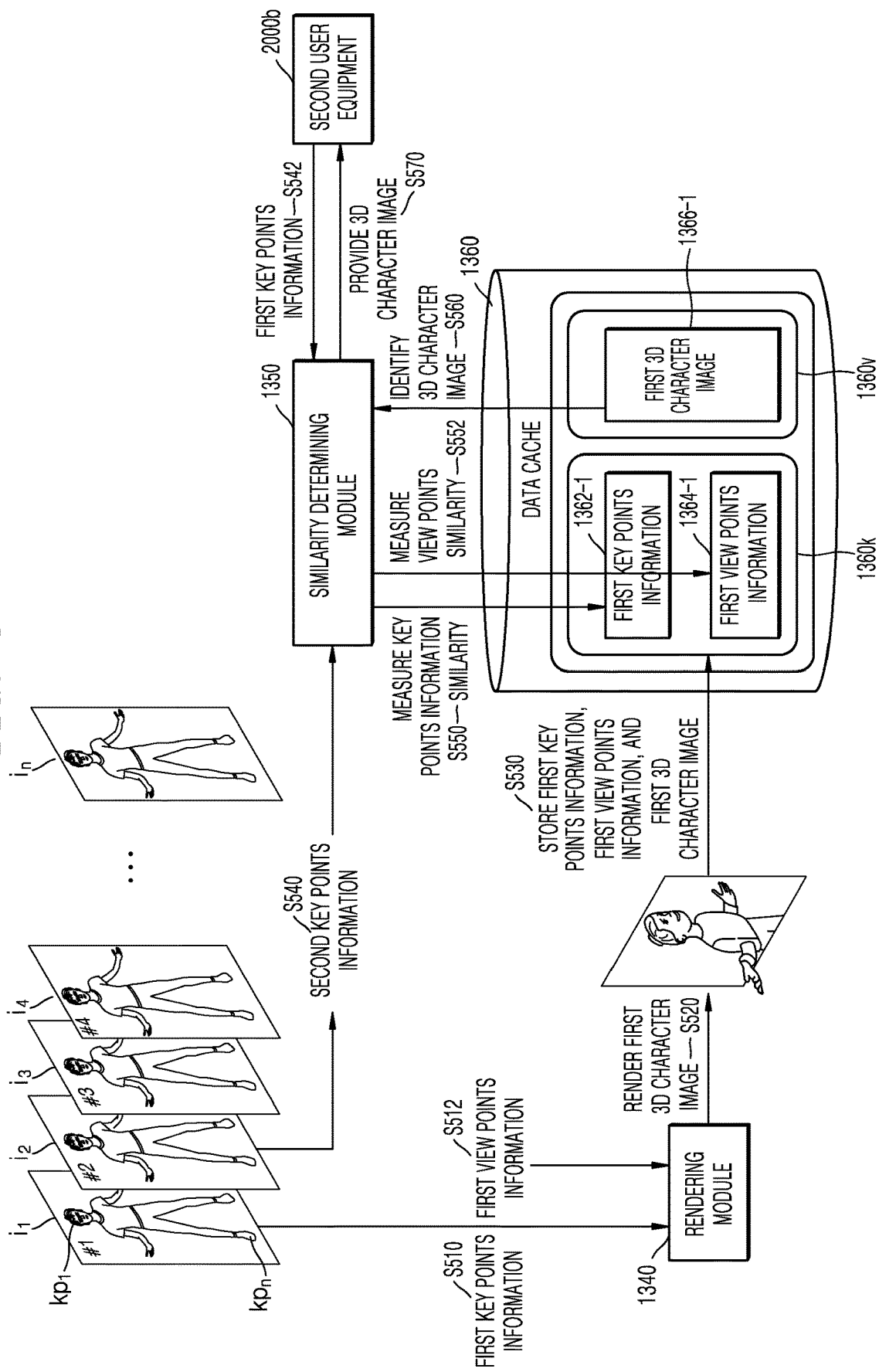
FIG. 5 is a diagram illustrating an operating method in which an edge data network according to an embodiment of the disclosure provides a 3D character image stored in a data cache, to a second user equipment based on a key points similarity and a view points similarity according to an embodiment of the disclosure.

FIG. 5 is a diagram illustrating an operating method in which an edge data network provides a 3D character image stored in a data cache, to a second user equipment, based on key a points similarity and a view points similarity according to an embodiment of the disclosure.

Referring to FIG. 5, a first user equipment 2000*a* (see FIG. 2) may obtain a plurality of image frames $i_1$ to $i_n$ by capturing an image of the first user. The plurality of image frames $i_1$ to $i_n$ may be sequentially obtained according to the time flow. The plurality of image frames $i_1$ to $i_n$ may constitute a moving picture showing the action or motion of the first user.

In operation S510, the edge data network 1000 receives first key points information extracted from the first image frame $i_1$. The edge data network 1000 may receive the first key points information from the first edge data network 1000a (see FIG. 2), but is not limited thereto. The first key points information may include feature coordinate values regarding a plurality of feature points $kp_1$ to $kp_n$ of the first user included in the first image frame $i_1$. The 'plurality of feature points $kp_1$ to $kp_n$' may be points indicating features related to body parts, postures, or the skeletal structure of a first user image included in the first image frame $i_1$. The plurality of feature points $kp_1$ through $kp_n$ may be extracted from, for example, features of body parts such as a face, shoulders, arms, thighs, and calves or features of the skeletal structure of a human body.

In an embodiment, the edge data network 1000 may include a key points extraction module 1320 (see FIG. 2). In this case, the edge data network 1000 may obtain a plurality of image frames $i_1$ to $i_n$ from the first user equipment 2000a, and extract first key points information from the first image frame $i_1$ from among the plurality of image frames $i_1$ to $i_n$.

In operation S512, the edge data network 1000 obtains first view points information. In an embodiment, the edge data network 1000 may obtain the first view points information from the second user equipment 2000b. The 'first view points information' is information about a virtual view point from which a 3D character image displayed via the display 2620 of the second user equipment 2000b is viewed by a virtual camera. The view points information may include virtual position coordinate value information indicating a position and direction in which a 3D character image is viewed via a virtual camera in a three-dimensional virtual space.

In operation S520, the rendering module 1340 of the edge data network 1000 renders a first 3D character image by using the first key points information and the first view points information.

In operation S530, the edge data network 1000 stores the first key points information, the first view points information, and the rendered first 3D character image in the data cache 1360. In an embodiment, the edge data network 1000 may store first key points information 1362-1, first view points information 1364-1, and a first 3D character image 1366-1 in the data cache 1360 as a key-value type. That is, the first key points information 1362-1 and the first view points information 1364-1 may be stored in the data cache 1360 as a key 1360k, and the first 3D character image 1366-1 rendered based on the first key points information 1362-1 and the first view points information 1364-1 may be stored in the data cache 1360 as a value 1360v. The key 1360k and the value 1360v may form a pair and be stored in the data cache 1360.

In operation S540, the edge data network 1000 obtains second key points information extracted from a second image frame $i_2$.

In operation S542, the edge data network 1000 obtains second view points information from the second user equipment 2000b.

In operation S550, the edge data network 1000 measures a key points similarity by comparing the second key points information with the first key points information 1362-1 stored in the data cache 1360 by using the similarity determining module 1350.

In operation S552, the edge data network 1000 measures a view points similarity by comparing the second view points information with the first view points information 1364-1 stored in the data cache 1360 by using the similarity determining module 1350.

The edge data network 1000 may compare the key points similarity with a preset first threshold and the view points similarity with a preset second threshold, respectively. When the key points similarity is greater than the first threshold, and the view points similarity is greater than the second threshold, the edge data network 1000 provides the first 3D character image 1366-1 stored in the data cache 1360 to the second user equipment 2000b in operation S570.

Figure 6:
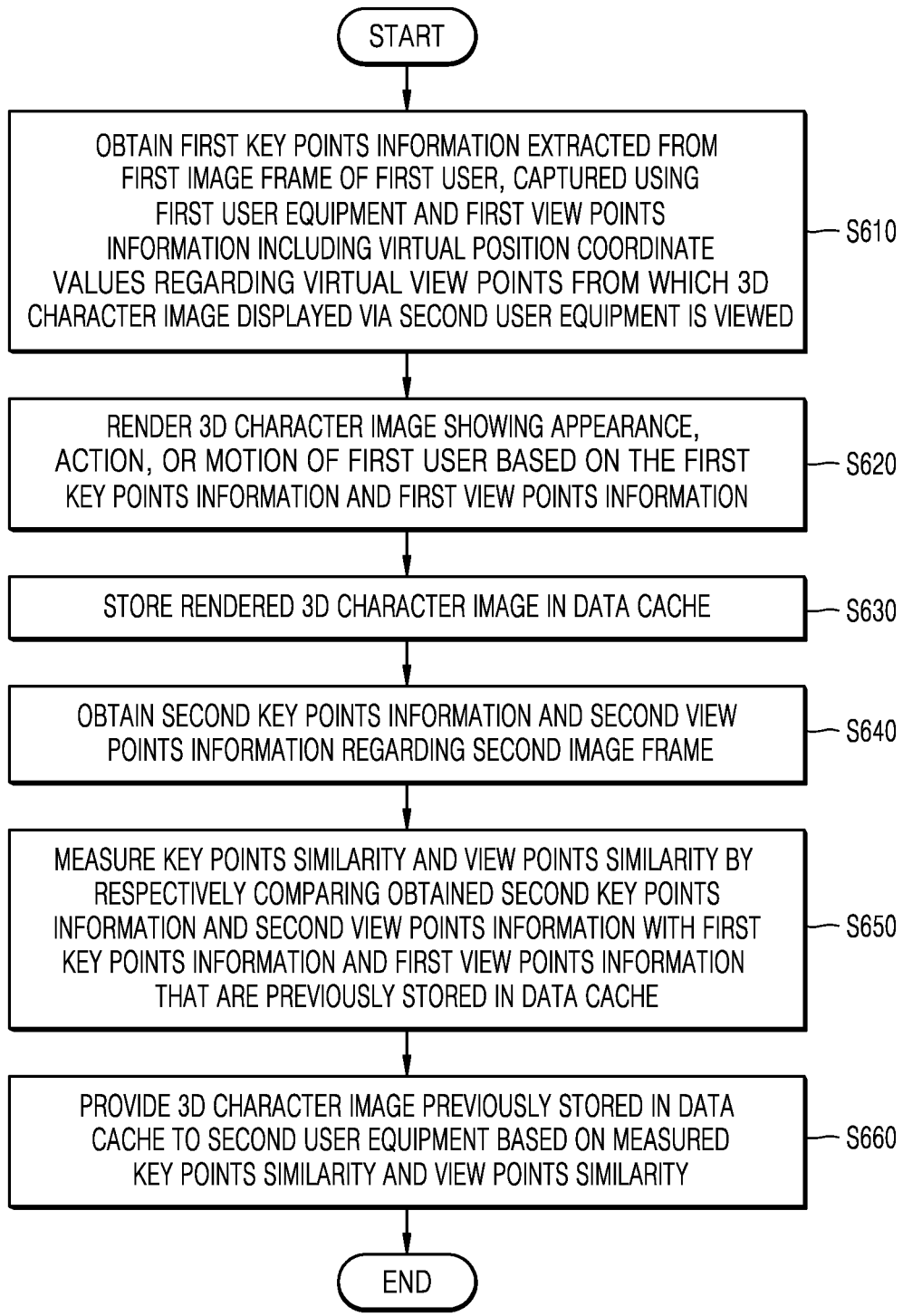
FIG. 6 is a flowchart of an operation procedure of an edge data network according to an embodiment of the disclosure.

FIG. 6 is a flowchart of an operation procedure of an edge data network according to an embodiment of the disclosure.

Referring to FIG. 6, in operation S610, an edge data network 1000 obtains first key points information extracted from a first image frame of a first user, captured using a first user equipment 2000a (see FIG. 2) and first view points information including virtual position coordinate values regarding virtual view points from which a 3D character image displayed via a second user equipment 2000b (see FIG. 2) is viewed. The first key points information may include feature coordinate values related to a plurality of feature points indicating features regarding the body parts, posture, or skeletal structure of the first user. In an embodiment, the edge data network 1000 may obtain the first key points information from another edge data network that is remotely located, but is not limited thereto.

In another embodiment, the edge data network 1000 may include a key points extraction module, and may extract first key points from the first image frame obtained from the first user equipment 2000a (see FIG. 2) by using the key points extraction module. In this case, the edge data network 1000 may extract a plurality of feature points from the first image frame by using a feature point extraction algorithm and obtain key points information including the plurality of feature points. The edge data network 1000 may extract a plurality of feature points from the first image frame by using, for example, a feature point extraction algorithm such as Scale Invariant Feature Transform (SIFT), Features from Accelerated Segment Test (FAST), Adaptive and Generic corner detection based on the Accelerated Segment Test (AGAST), or Binary robust independent elementary features (Brief) or by using machine learning.

The first view points information is information about a virtual view point from which a 3D character image displayed via the display 2620 (see FIG. 2) of the second user equipment 2000b is viewed through a virtual camera in a three-dimensional virtual space. The first view points information may include virtual position coordinate value information indicating a position and direction in which a virtual camera views a 3D character image.

In operation S620, the edge data network 1000 renders a 3D character image showing the appearance, action, or motion of the first user based on the first key points information and the first view points information. In an embodiment, the edge data network 1000 may render a 3D character image of a preset size by resizing and adjusting a scale of a plurality of feature coordinate values included in the first key points information. In an embodiment, the edge data network 1000 may determine a position and direction in which a 3D character image is displayed based on virtual view points information for viewing the 3D character image, included in the view points information, and render the 3D character image to be displayed according to the determined position and direction.

In an embodiment, the edge data network 1000 may receive user identification information of the first user, and select, based on the user identification information, a 3D character image corresponding to the first user from among a plurality of 3D character images previously stored in the memory 1300 (see FIG. 4). In an embodiment, the edge data network 1000 may render a 3D character image according to the first key points information and the first view points information by using the selected 3D character image.

In operation S630, the edge data network 1000 stores the rendered 3D character image in a data cache. In an embodiment, the edge data network 1000 may store the first key points information, the first view points information, and the 3D character image in the data cache 1360 as a key-value type. The edge data network 1000 may store the first key points information and the first view points information as a key and the rendered 3D character image as a value, in the data cache 1360.

In an embodiment, the edge data network 1000 may store, together with a rendered 3D character image in the data cache, at least one of user identification information of the first user, a plurality of pieces of previously obtained key points information regarding the appearance, actions conducted in the past, motions, postures or directions of the first user, priority information for determining a key points similarity, and information about a teleconference type.

In operation S640, the edge data network 1000 obtains second key points information and second view points information regarding a second image frame. The second image frame is an image obtained by the first user equipment 2000*a* after the first image frame. A detailed method of obtaining the second key points information and obtaining the second view points information is the same as the method described with reference to operation S610, and thus, repeated description will be omitted.

In operation S650, the edge data network 1000*b* may measure a key points similarity and a view points similarity by respectively comparing the obtained second key points information and second view points information with the first key points information and first view points information that are previously stored in the data cache. In an embodiment, the edge data network 1000 may measure a key points similarity and a view points similarity by using a Euclidean distance or a Cosine similarity measurement method.

In operation S660, the edge data network 1000 provides a 3D character image previously stored in the data cache to the second user equipment 2000*b* (see FIG. 2) based on the measured key points similarity and view points similarity. In an embodiment, the edge data network 1000 may compare the measured key points similarity with the preset first threshold and the measured view points similarity with the preset second threshold. When the key points similarity is greater than the first threshold, and the view points similarity is greater than the second threshold, the edge data network 1000 may determine that the second key points information is similar to the first key points information previously stored in the data cache, and the second view points information is similar to the first view points information previously stored in the data cache. In this case, the edge data network 1000 may access the data cache to identify a 3D character image cached in association with the cached key points information and view points information. The edge data network 1000 may read out the identified 3D character image from the data cache and transmit the read out 3D character image to the second user equipment 2000*b* via the network interface 1100 (see FIG. 4).

Figure 7:
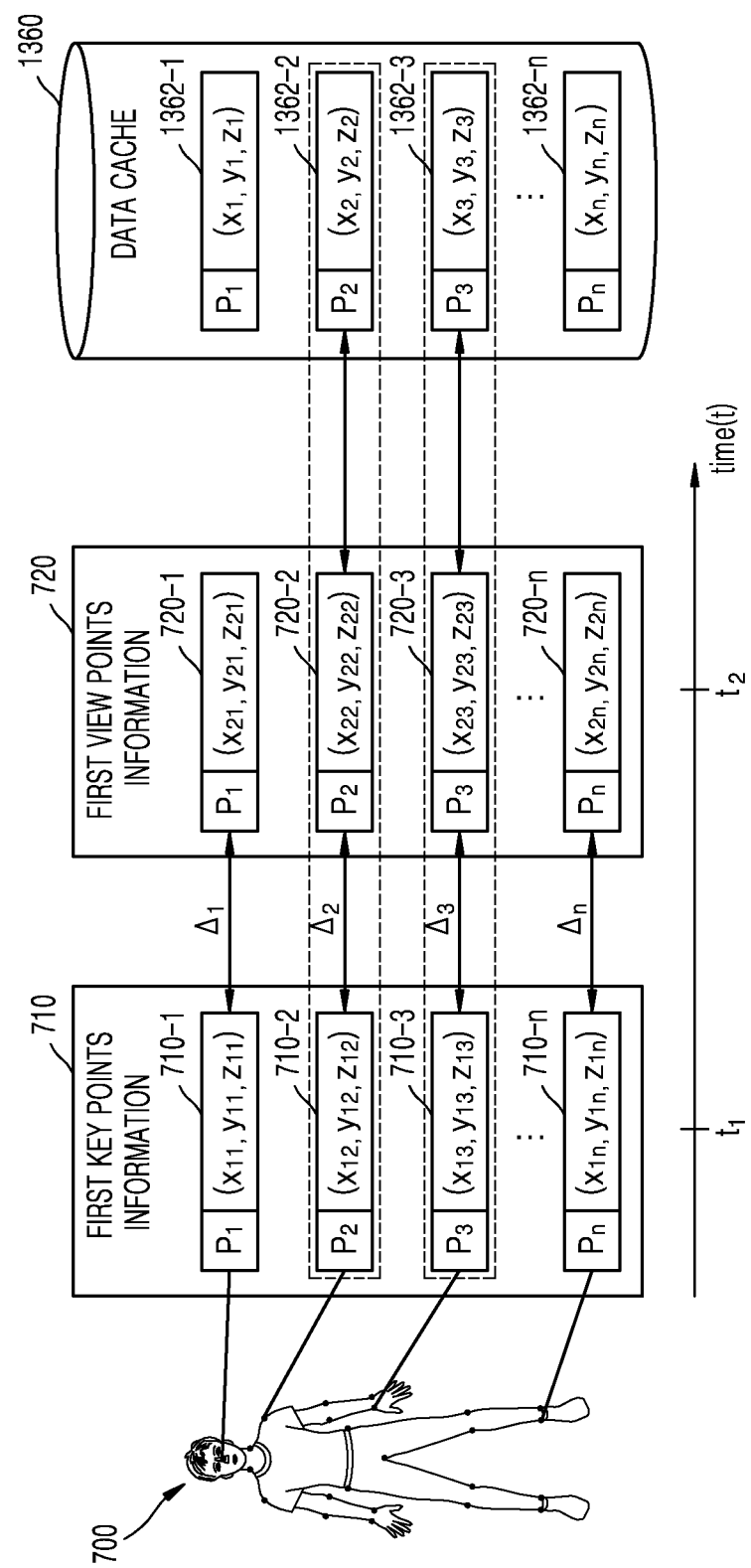
FIG. 7 illustrates a method, performed by an edge data network of measuring a key points similarity according to an embodiment of the disclosure.

FIG. 7 illustrates a method, performed by an edge data network of measuring a key points similarity according to an embodiment of the disclosure.

Referring to FIG. 7, an edge data network 1000 may sequentially obtain key points information 710 and 720 including a plurality of feature points $P_1$ to $P_n$ extracted from an actor image 700 according to the time flow. In an embodiment, the edge data network 1000 may receive the key points information 710 and 720 from another edge data network (e.g., the first edge data network 1000*a* (see FIG. 2)), but is not limited thereto. In an embodiment, the edge data network 1000 may obtain the key points information 710 and 720 by obtaining an actor image from the first user equipment 2000*a* (see FIG. 2) and extracting a plurality of feature points from the obtained actor image.

The first key points information 710 and the second key points information 720 may be extracted from each of a plurality of actor images 700 obtained by continuously capturing images of a user according to the time flow. The first key points information 710 is information obtained at a first time point $t_1$, and may include three-dimensional position coordinate values 710-1 to 710-*n* regarding the plurality of feature points $P_1$ to $P_n$ extracted from the actor image 700 obtained by recording at the first time point $t_1$. The second key points information 720 is information obtained at a second time point $t_2$, and may include three-dimensional position coordinate values 720-1 to 720-*n* of the plurality of feature points $P_1$ to $P_n$ extracted from the actor image 700 obtained by recording at the second time point $t_2$.

In an embodiment, the edge data network 1000 may respectively calculate a difference value between the plurality of three-dimensional position coordinate values 710-1 to 710-*n* included in the first key points information 710 and the plurality of three-dimensional position coordinate values 720-1 to 720-*n* included in the second key points information 720. For example, the processor 1200 of the edge data network 1000 (see FIG. 4) may calculate a difference value $\Delta_1$ between a first position coordinate value 710-1 with respect to a first feature point $P_1$ included in the first key points information 710 and a first position coordinate values 720-1 with respect to a first feature point $P_1$ included in the second key points information 720. Similarly, the processor 1200 may calculate a difference value $\Delta_2$ between a second position coordinate value 710-2 with respect to a second feature point $P_2$ included in the first key points information 710 and a second position coordinate value 720-2 with respect to a second feature point $P_2$ included in the second key points information 720. According to the above-described method, the processor 1200 may calculate a difference value $\Delta_n$ between an nth position coordinate value 710-*n* with respect to an nth feature point $P_n$ included in the first key points information 710 and an nth position coordinate value 720-*n* with respect to an nth feature point $P_n$ included in the second key points information 720.

The edge data network 1000 may compare difference values $\Delta_1$ with $\Delta_n$ calculated with respect to each of the plurality of feature points $P_1$ to $P_n$ with a preset threshold, and identify at least one feature point, the calculated difference values $\Delta_1$ to $\Delta_n$ of which exceeds the threshold. In the embodiment illustrated in FIG. 7, $\Delta_2$ and $\Delta_3$ exceed the preset threshold, and accordingly, the processor 1200 of the edge data network 1000 may identify, from among the plurality of position coordinate values 720-1 to 720-*n* included in the second key points information 720, three-dimensional position coordinate values 720-2 and 720-3 of the second feature point P$_2$ and the third feature point P$_3$, the difference value of which exceeds the threshold.

The edge data network 1000 may identify position coordinate values corresponding to the position coordinate values (720-2, 720-3 in FIG. 7) with respect to at least one identified feature point, from the data cache 1360. In the embodiment illustrated in FIG. 7, three-dimensional position coordinate values (e.g., key points information 1362-1 to 1362-*n*) with respect to the plurality of feature points P$_1$ to P$_n$, respectively, are cached in the data cache 1360, and the processor 1200 of the edge data network 1000 may identify position coordinate values (e.g., key points information 1362-2 and 1362-3) respectively corresponding to the second position coordinate value 720-2 and the third position coordinate value 720-3, a difference value of which exceeds a preset threshold, from among a plurality of three-dimensional position coordinate values (e.g., key points information 1362-1 to 1362-*n*) included in key points information cached in the data cache 1360.

The edge data network 1000 may measure a key points similarity by measuring a similarity between the second position coordinate value 720-2 and the third position coordinate value 720-3 identified from the second key points information 720 and the second position coordinate value (e.g., first key points information 1362-1) and the third position coordinate value 1362-3 identified from the data cache 1360.

Figure 8:
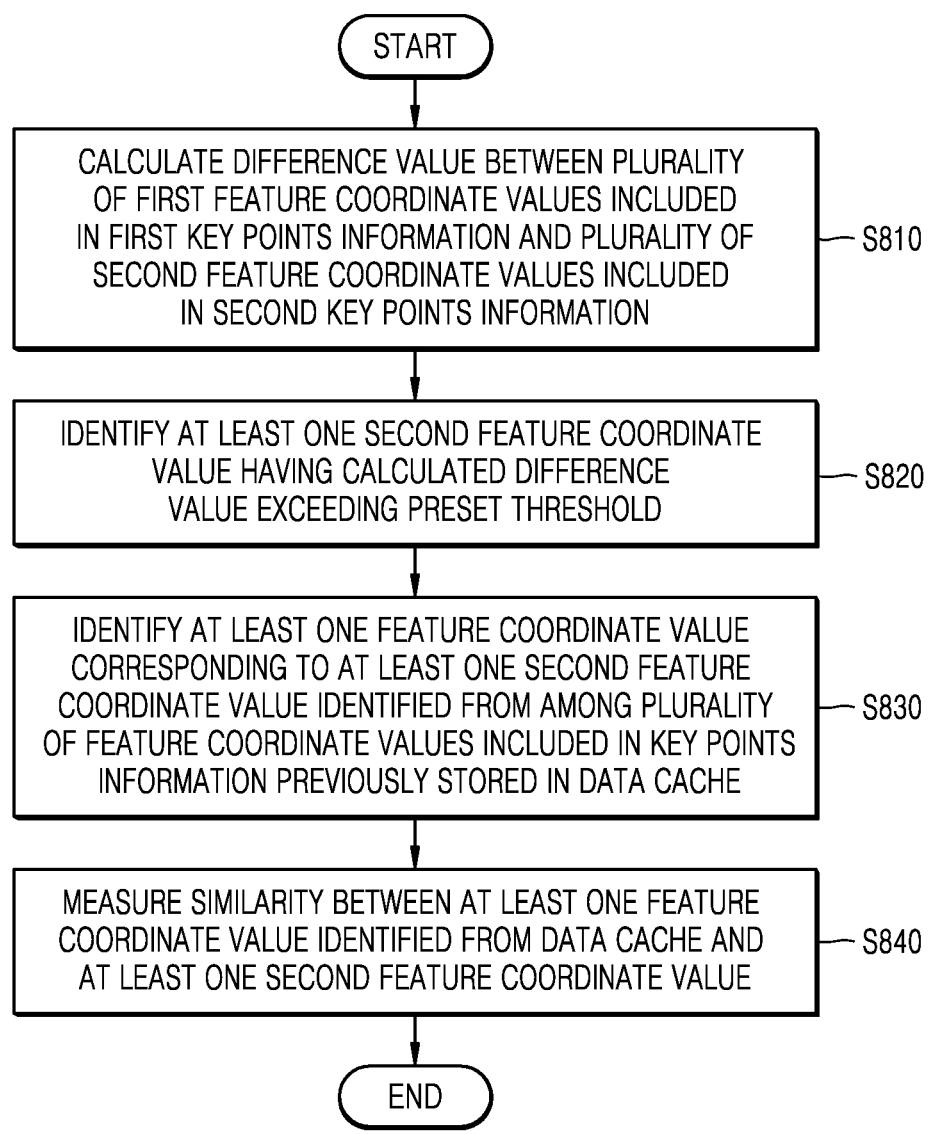
FIG. 8 is a flowchart of a method, performed by an edge data network of measuring a key points similarity according to an embodiment of the disclosure.

FIG. 8 is a flowchart of a method, performed by an edge data network of measuring a key points similarity according to an embodiment of the disclosure.

Referring to FIG. 8, in operation S810, an edge data network 1000 calculates a difference value between a plurality of first feature coordinate values included in first key points information and a plurality of second feature coordinate values included in second key points information. In an embodiment, the edge data network 1000 may receive the first key points information and the second key points information from another edge data network that is located at a remote location, but is not limited thereto. In another embodiment, the edge data network 1000 may obtain the first key points information and the second key points information by sequentially obtaining a plurality of actor images from a user equipment according to the time flow and extracting a plurality of feature points from each of the obtained plurality of actor images.

The edge data network 1000 may respectively calculate a difference value between a plurality of first feature coordinate values included in the first key points information and a plurality of second feature coordinate values included in the second key points information, with respect to each of a plurality of feature coordinate values.

In operation S820, the edge data network 1000 identifies at least one second feature coordinate value having a calculated difference value exceeding a preset threshold. The edge data network 1000 may identify at least one second feature coordinate value having a calculated difference value exceeding a preset threshold, from among a plurality of second feature coordinate values included in the second key points information.

In operation S830, the edge data network 1000 identifies at least one feature coordinate value corresponding to at least one second feature coordinate value identified from among a plurality of feature coordinate values included in key points information previously stored in a data cache. A plurality of feature coordinate values with respect to each of the plurality of feature points are cached in the data cache, and the edge data network 1000 may identify at least one feature coordinate value corresponding to at least one second feature coordinate value identified in operation S820 from among the plurality of feature coordinate values cached in the data cache.

In operation S840, the edge data network 1000 measures a similarity between the at least one feature coordinate value identified from the data cache and the at least one second feature coordinate value. The edge data network 1000 may measure a similarity between the second key points information and the key points information cached in the data cache by using the measured similarity information.

The edge data network 1000 may determine whether to use a 3D character image cached in the data cache by using the similarity measured in operation S840.

In an environment in which a plurality of actor images are obtained at a high Frames per second (FPS), a difference in a plurality of feature coordinate values respectively included in key points information of a previous image frame and key points information of a current image frame is not large. For example, in the case of a motion, in which a user raises his/her right hand or moves his/her left arm, there is no substantial change in position coordinate values of feature points corresponding to body parts except for the hand or arm between the previous image frame and the current image frame. However, a change value of a position coordinate value of a feature point corresponding to a moving body part, for example, the right hand or the left arm, may be relatively large depending on an image frame.

In the embodiment illustrated in FIGS. 7 and 8, the edge data network 1000 may not measure a similarity by comparing all of a plurality of three-dimensional position coordinate values respectively included in the plurality of pieces of key points information 710 and 720 that are successively obtained according to the time flow, with the plurality of position coordinate values (e.g., key points information 1362-1 to 1362-*n*) cached in the data cache 1360, but may measure a similarity by comparing only some three-dimensional position coordinate values 720-2 and 720-3, a difference value of which exceeds a preset threshold, with the cached position coordinate values (e.g., key points information 1362-2 and 1362-3), thereby reducing the amount of computation. Accordingly, the edge data network 1000 according to the embodiment illustrated in FIGS. 7 and 8 may reduce computing power consumed by the processor 1200 and reduce the processing time.

Figure 9:
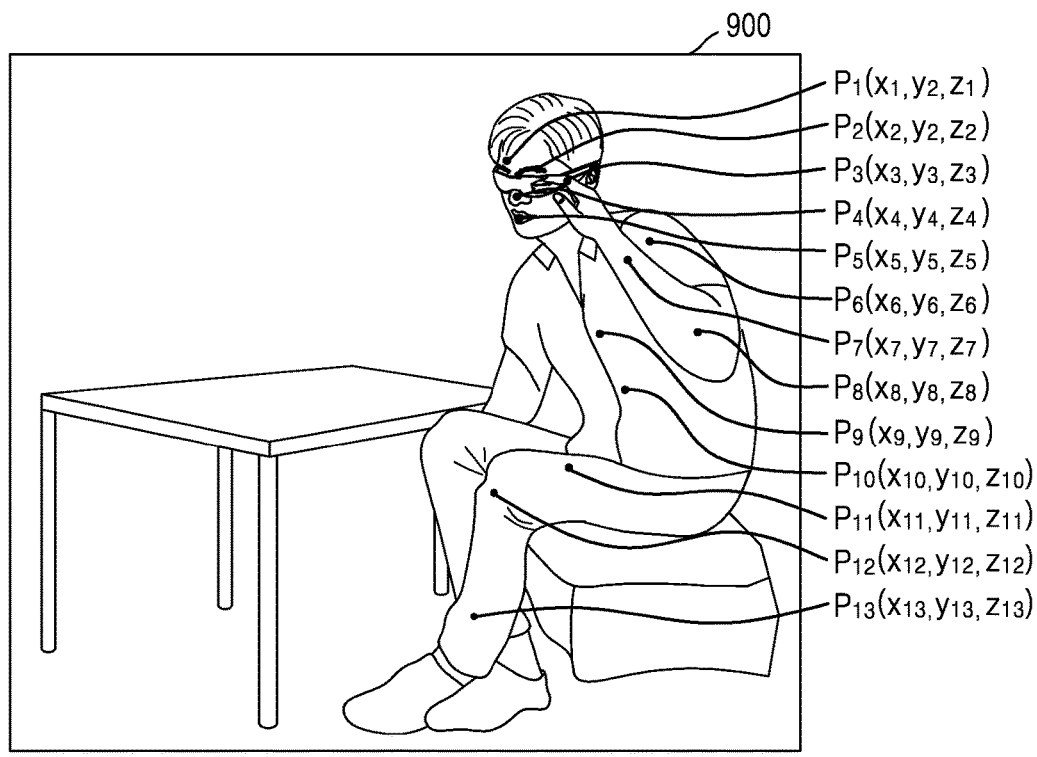
FIG. 9 is a diagram for describing priorities of a plurality of feature coordinate values included in key points information, determined by an edge data network according to an embodiment of the disclosure.

FIG. 9 is a diagram for describing priorities of a plurality of feature coordinate values included in key points information, determined by an edge data network according to an embodiment of the disclosure.

Referring to FIG. 9, an edge data network 1000 may obtain key points information regarding three-dimensional position coordinate values of each of a plurality of feature points P$_1$ to P$_{13}$ included in an actor image 900. In an embodiment, the edge data network 1000 may select at least one feature point extracted from a body part having a high priority according to predetermined priority, from among the plurality of feature points P$_1$ to P$_{13}$, and select a three-dimensional position coordinate value with respect to the selected at least one feature point.

In an embodiment, the priority may be determined based on the degree and frequency of movement of the user's body part according to the type or property of a teleconference conducted via the edge data network 1000. The priority may be previously determined based on the type of teleconference, and information about the priority may be stored in the memory 1300 of the edge data network 1000. For example, when the type of teleconference is a meeting conducted while sitting at a desk, the movement of the legs, waist, and pelvis among the user's body parts do not significantly affect the content of the meeting or communication of opinions, but hand movements, facial expressions, the angle of the head and the direction of the gaze are relatively important factors. For example, when a teleconference is of a type that is performed while sitting at a desk, the processor 1200 of the edge data network 1000 (see FIG. 4) may assign a higher priority to at least one feature point corresponding to the hands, arms, head, or gaze from among the plurality of feature points $P_1$ to $P_n$ than to feature points corresponding to the legs, waist, or pelvis.

As another example, in the case of a standing meeting, a meeting for delivering exercise information, or physical education, the importance of the degree and frequency of movement of the legs, waist, pelvis, etc. among the user's body parts is similar to that of the hands, arms, the face, etc. The processor 1200 may not assign a specific priority to the plurality of feature points $P_1$ to $P_n$, when, for example, a teleconference is a standing meeting or a conference type in which exercise information is delivered.

In an embodiment, the edge data network 1000 may determine priorities with respect to the plurality of feature points $P_1$ to $P_{13}$ according to a teleconference performance history at a time point in the past. The processor 1200 may calculate a difference value between a plurality of feature coordinate values respectively included in a plurality of pieces of key points information previously obtained through a teleconference conducted at a time point in the past and stored in the data cache, list the calculated difference values from large to small, and determine a priority according to body parts respectively corresponding to the plurality of feature coordinate values based on the order of the listed difference values.

In the embodiment of FIG. 9, priorities of the plurality of feature points $P_1$ to $P_n$ may be determined in an order from a sixth feature point $P_6$ corresponding to the shoulders, a seventh feature point $P_7$, corresponding to the arms, an eighth feature point $P_8$ corresponding to the elbow, a fourth feature point $P_4$ corresponding to the hand, and to a thirteenth feature point $P_{13}$ corresponding to the calf. The embodiment illustrated in FIG. 9 is only an example, and the priority of the disclosure is not limited to the illustrated one.

The processor 1200 of the edge data network 1000 may select only at least one feature point ($P_3$, $P_6$, $P_7$, $P_8$) from among the plurality of feature points $P_1$ to $P_n$ listed according to the priority. The processor 1200 may obtain at least one three-dimensional position coordinate value with respect to each of the selected at least one feature point $P_3$, $P_6$, $P_7$, $P_8$, and identify at least one three-dimensional position coordinate value corresponding to at least one three-dimensional position coordinate value with respect to each of at least one feature point $P_3$, $P_6$, $P_7$, $P_8$ from among the plurality of three-dimensional position coordinate values included in the key points information cached in the data cache. The processor 1200 may measure a similarity between at least one three-dimensional position coordinate value with respect to each of the at least one feature point $P_3$, $P_6$, $P_7$, $P_8$ and at least one three-dimensional position coordinate value identified from the cached plurality of cached three-dimensional position coordinate values. The processor 1200 may determine, by using the measured similarity, whether to use a 3D character image cached in the data cache.

Figure 10:
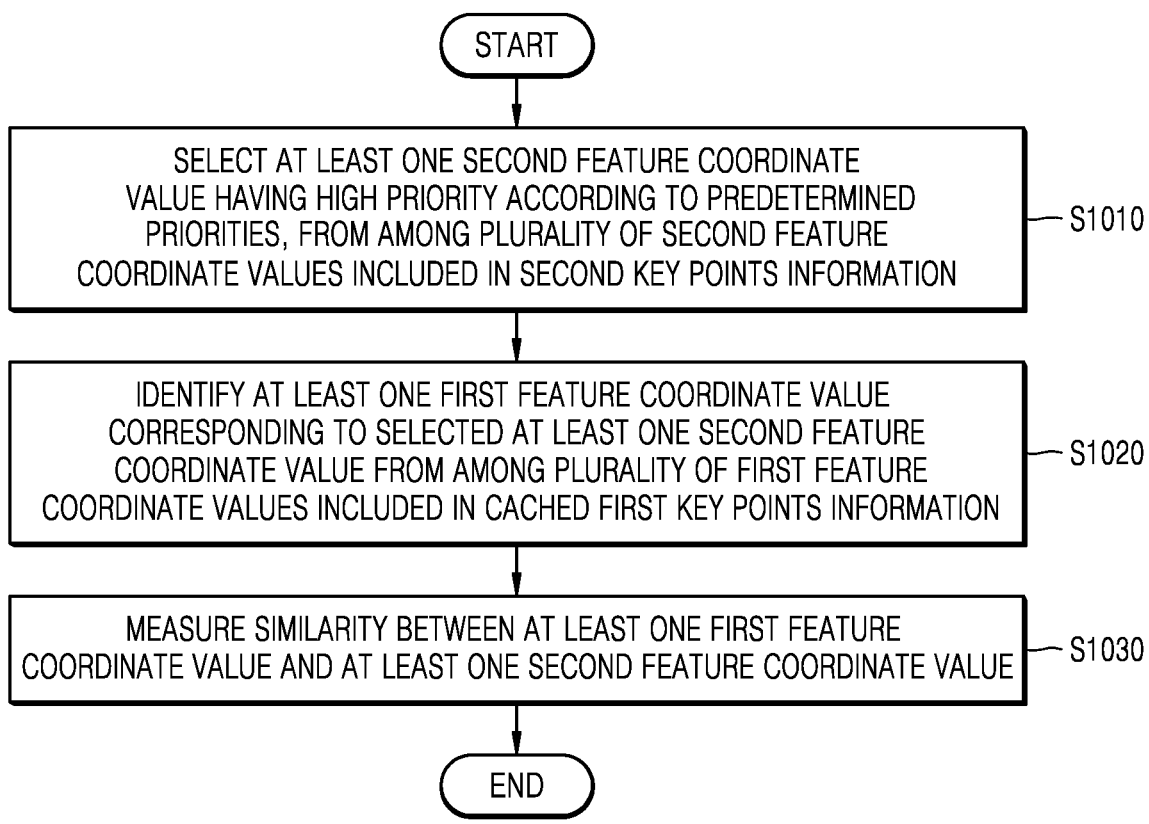
FIG. 10 is a flowchart of a method, performed by an edge data network of determining a key points similarity based on priorities of a plurality of feature coordinate values included in key points information according to an embodiment of the disclosure.

FIG. 10 is a flowchart of a method, performed by an edge data network of determining a key points similarity based on priorities of a plurality of feature coordinate values included in key points information according to an embodiment of the disclosure.

Referring to FIG. 10, in operation S1010, an edge data network 1000 selects at least one second feature coordinate value having a high priority according to predetermined priorities, from among a plurality of second feature coordinate values included in second key points information. The second key points information is key points information sequentially obtained after the first key points information. The first key points information may be stored in a data cache in a 'caching' manner.

The priority of the plurality of feature coordinate values may be previously determined based on a type of teleconference. In an embodiment, the priority may be determined based on the degree and frequency of movement of a user's body part according to the type or property of a teleconference conducted via the edge data network 1000.

However, the disclosure is not limited thereto, and the priority of the plurality of feature coordinate values may be determined according to a performance history of a teleconference that was performed by the edge data network 1000 at a time point in the past. In an embodiment, the edge data network 1000 may calculate a difference value between a plurality of feature coordinate values respectively included in a plurality of pieces of key points information previously obtained through a teleconference conducted at a time point in the past and stored in the data cache, list the calculated difference values from large to small, and determine a priority according to body parts respectively corresponding to the plurality of feature coordinate values based on the order of the listed difference values.

The edge data network 1000 may select at least one second feature coordinate value having a high priority from among a plurality of second feature coordinate values included in the second key points information. In an embodiment, the edge data network 1000 may list a plurality of second feature coordinate values in an order from a high priority to a low priority, and select only a preset number of feature coordinate values that have a high priority among the listed plurality of second feature coordinate values. For example, the edge data network 1000 may select only four feature coordinate values having a high priority among the plurality of second feature coordinate values, but the number of feature coordinate values to be selected is not limited to four.

In operation S1020, at least one first feature coordinate value corresponding to the selected at least one second feature coordinate value is identified from among a plurality of first feature coordinate values included in the cached first key points information. In an embodiment, the edge data network 1000 may identify at least one first feature coordinate value corresponding to the selected at least one second feature coordinate value selected from the second key points information in operation S1010, from among the plurality of first feature coordinate values included in the first key points information cached in the data cache. The edge data network 1000 may identify, from the plurality of first feature coordinate values cached in the data cache, at least one second feature coordinate value, that is, at least one feature coordinate value with respect to a feature point that is identical to a feature point extracted from at least one body part selected in order of highest priority.

In operation S1030, the edge data network 1000 measures a similarity between the at least one first feature coordinate value and the at least one second feature coordinate value. In an embodiment, the edge data network 1000 may measure a similarity between the at least one second feature coordinate value selected in operation S1010 and the at least one first feature coordinate value identified in operation S1020. The edge data network 1000 may determine whether to use a 3D character image cached in the data cache, by using the measured similarity.

In general, as a teleconference is frequently conducted in a sitting state, the frequency of movement of the hands, arms, face, etc. is higher than that of the movement of the waist or legs, and the degree of movement thereof is also larger. That is, the frequency and degree of motion or movement according to the user's body parts may vary according to the type of conference. In the embodiment illustrated in FIGS. 9 and 10, the edge data network 1000 does not measure a similarity by comparing all of the plurality of feature coordinate values extracted from the user's body parts with the plurality of feature coordinate values cached in the data cache, but may measure a similarity of a selected at least one feature coordinate value, and thus, the amount of computation of the processor 1200 may be reduced. Accordingly, the edge data network 1000 according to the embodiment illustrated in FIGS. 9 and 10 may reduce computing power consumed by the processor 1200 and reduce the processing time.

Figure 11:
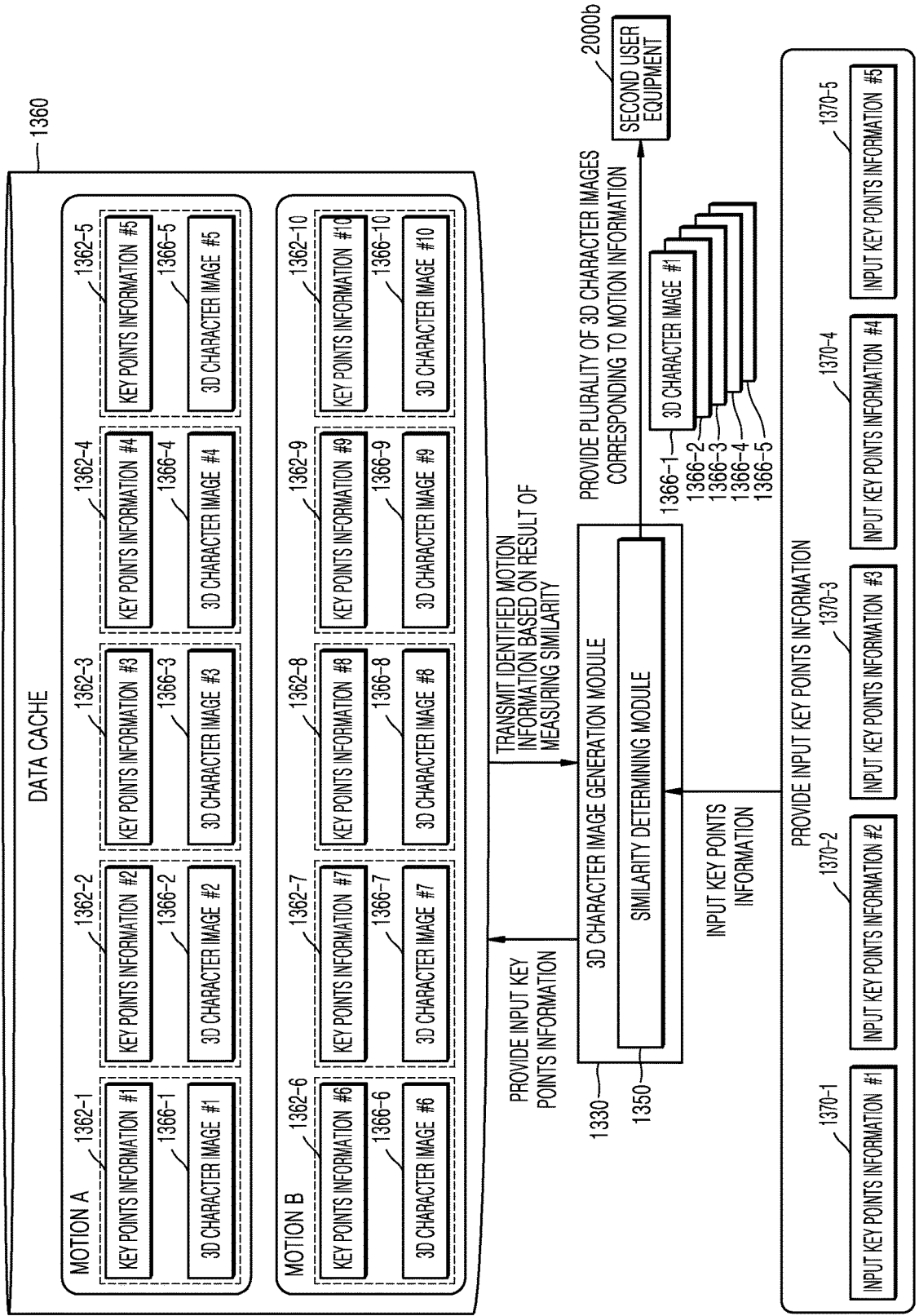
FIG. 11 illustrates a method, performed by an edge data network of measuring a similarity between a plurality of pieces of key points information stored in a data cache in units of motions and a plurality of pieces of input key points information, and providing a 3D character image to a second user equipment based on the measured similarity according to an embodiment of the disclosure.

FIG. 11 illustrates a method, performed by an edge data network of measuring a similarity between a plurality of pieces of key points information stored in a data cache in units of motions and a plurality of pieces of input key points information, and providing a 3D character image to a second user equipment based on the measured similarity according to an embodiment of the disclosure.

Referring to FIG. 11, in a data cache 1360, a plurality of pieces of key points information 1362-1 to 1362-10 and a plurality of 3D character images 1366-1 to 1366-10 may be classified according to motion information and stored. In the embodiment illustrated in FIG. 11, information regarding motions A and B is stored in the data cache 1360, and motion A may include first key points information 1362-1 to fifth key points information 1362-5 and a first 3D character image 1366-1 to a fifth 3D character image 1366-5, and motion B may include sixth key points information 1362-6 to tenth key points information 1362-10 and a sixth 3D character image 1366-6 to a tenth 3D character image 1366-10. Key points information and 3D character images respectively corresponding to the plurality of pieces of key points information 1362-1 to 1362-10 and the plurality of 3D character images 1366-1 to 1366-10 may be stored as a key-value type. For example, the first 3D character image 1366-1 stored in the data cache 1360 may be a value, and may be an image frame generated based on a key corresponding to the first key points information 1362-1.

Motion A and motion B indicate information about motions repeatedly conducted by a user. For example, motion A may indicate a motion in which the user moves his or her right hand from a reference position to a certain position and then back to the reference position. In this case, the edge data network 1000 may obtain a plurality of actor image frames according to the motion of the user (e.g., five image frames), extract a plurality of pieces of key points information about a plurality of feature points respectively extracted from the plurality of actor images (e.g., the first key points information 1362-1 to the fifth key points information 1362-5), and group the extracted plurality of pieces of key points information as motion A and store the same in the data cache 1360.

The edge data network 1000 may measure a key points similarity by receiving key points information from another edge data network or user equipment arranged in a remote place and comparing the input key points information with each of a plurality of pieces of key points information classified in motion units and stored in the data cache 1360. In an embodiment, the edge data network 1000 may receive key points information via the network interface 1100 (see FIG. 4). The input key points information may include first input key points information 1370-1 to fifth input key points information 1370-5 that are sequentially input according to the time flow. The processor 1200 may provide the first input key points information 1370-1 to the fifth input key points information 1370-5 to the similarity determining module 1350. The processor 1200 (see FIG. 4) may provide the input key points information to the data cache 1360 and measure a similarity between the input key points information with the key points information cached in the data cache 1360 by executing data or program code related to the similarity determining module 1350 included in the 3D character image generation module 1330.

The processor 1200 may obtain, from the data cache 1360, a plurality of pieces of key points information, a measured key points similarity of which is greater than a preset threshold. In the embodiment illustrated in FIG. 11, as a result of measuring the key points similarity, key points information that is identified to be similar to each of the first input key points information 1370-1 to the fifth input key points information 1370-5 included in the input key points information may be the first key points information 1362-1 to the fifth key points information 1362-5. The first key points information 1362-1 to the fifth key points information 1362-5 are classified as motion A and stored in the data cache 1360, and the processor 1200 may obtain motion information, that is, information indicating that a motion having a high similarity to the input key points information is motion A, from the data cache 1360.

The processor 1200 may identify a plurality of 3D character images corresponding to the motion information from the data cache 1360 by executing data or program code related to the 3D character image generation module 1330. In the embodiment illustrated in FIG. 11, the processor 1200 may identify the first 3D character image 1366-1 to the fifth 3D character image 1366-5 corresponding to motion A.

The processor 1200 may read out the identified plurality of 3D character images 1366-1 to 1366-5 from the data cache 1360, and transmit the read-out, plurality of 3D character images 1366-1 to 1366-5 to the second user equipment 2000b. In an embodiment, the processor 1200 may transmit the plurality of 3D character images 1366-1 to 1366-5 to the second user equipment 2000b by using the network interface 1100.

Figure 12:
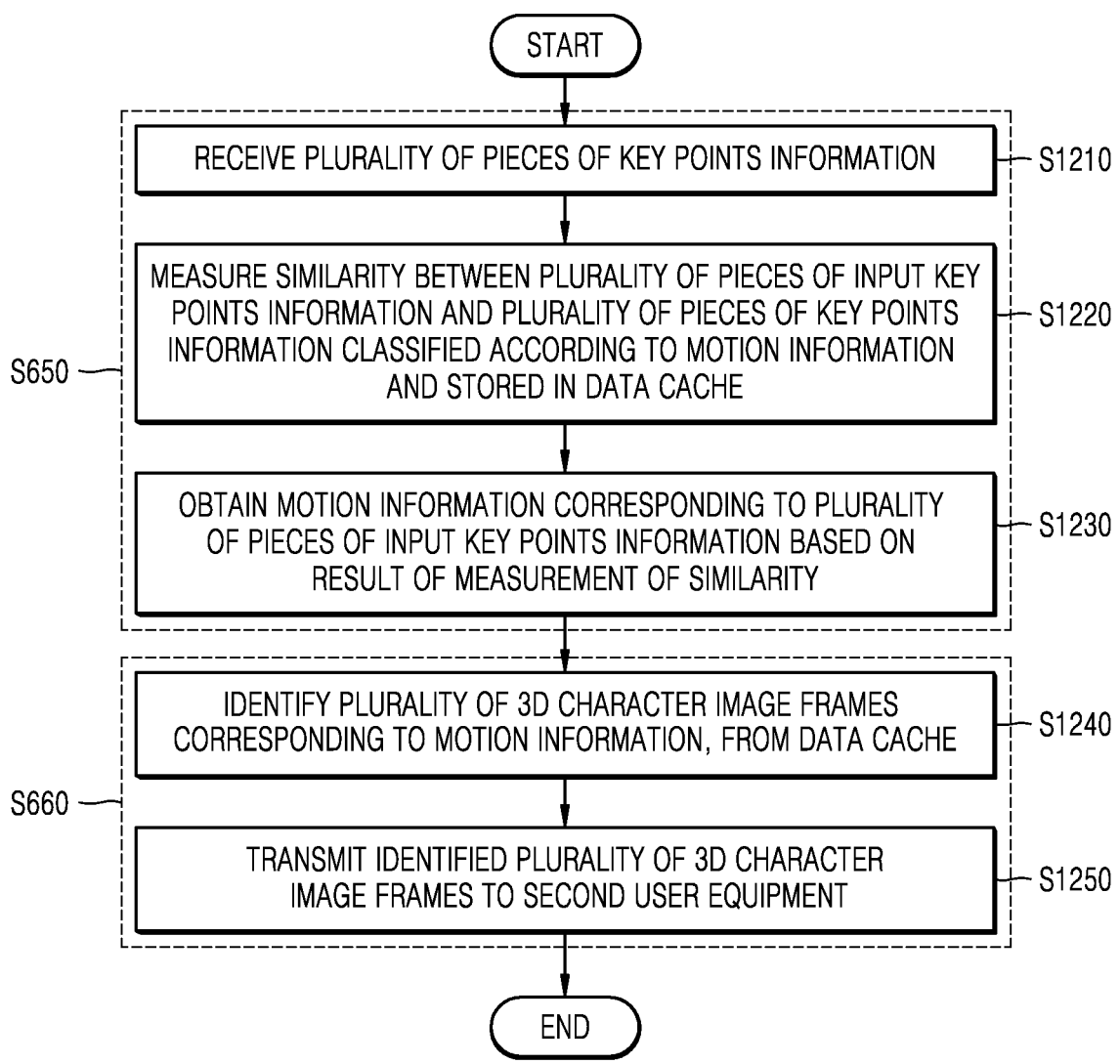
FIG. 12 is a flowchart of a method, performed by an edge data network of measuring a similarity between a plurality of pieces of key points information stored in a data cache in units of motions and a plurality of pieces of input key points information, and providing a 3D character image to a second user equipment based on the measured similarity according to an embodiment of the disclosure.

FIG. 12 is a flowchart of a method, performed by an edge data network of measuring a similarity between a plurality of pieces of key points information stored in a data cache in units of motions and a plurality of pieces of input key points information, and providing a 3D character image to a second user equipment based on the measured similarity according to an embodiment of the disclosure.

Operations S1210 to S1230 illustrated in FIG. 12 are specific operations of operation S650 illustrated in FIG. 6, and operations S1240 and S1250 are specific operations of operation S660 illustrated in FIG. 6.

Referring to FIG. 12, in operation S1210, an edge data network 1000 receives a plurality of pieces of key points information. In an embodiment, the edge data network 1000 may sequentially receive a plurality of pieces of key points information according to the time flow from another edge data network or user equipment located in a remote location.

In operation S1220, the edge data network 1000 measures a similarity between a plurality of pieces of input key points information and a plurality of pieces of key points information classified according to motion information and stored in the data cache.

In operation S1230, the edge data network 1000 obtains motion information corresponding to the plurality of pieces of input key points information based on a result of measurement of the similarity. In an embodiment, the edge data network 1000 may identify, from the data cache, a plurality of pieces of key points information having a measured key points similarity exceeding a preset threshold. In an embodiment, the edge data network 1000 may obtain motion information in which the identified plurality of pieces of key points information are classified.

In operation S1240, the edge data network 1000 identifies a plurality of 3D character image frames corresponding to the motion information, from the data cache. In an embodiment, key points information and 3D character images may be stored in the data cache as key-value types between respectively corresponding key points information and the 3D character image frames. The edge data network 1000 may identify, from the data cache, a plurality of 3D character image frames that are stored as a key-value type to correspond to a plurality of pieces of key points information classified as motion information and stored.

In operation S1250, the edge data network 1000 transmits the identified plurality of 3D character image frames to the second user equipment.

In general, in a teleconference, a user may repeatedly conduct a certain action, for example, pointing to a specific object with his or her right hand, raising both hands, or the like. In the case of conducting a teleconference via the edge data network 1000, it takes a large amount of computation and computing power to extract feature points from each of a plurality of actor images obtained by photographing a user with respect to a repeated action and render a plurality of 3D character images by using three-dimensional position coordinate values of the feature points.

In the embodiment illustrated in FIGS. 11 and 12, the edge data network 1000 may classify a plurality of pieces of key points information obtained with respect to repeated motions and a plurality of 3D character images rendered using the plurality of pieces of key points information and store the same in the data cache 1360; when the same motion is repeated, the edge data network 1000 may measure a key points similarity by comparing a plurality of pieces of key points information input in relation to the motion with a plurality of pieces of key points information cached in the data cache 1360, and may provide a plurality of cached 3D character images based on the measured key points similarity. According to the edge data network 1000 according to the disclosure, there is no need to perform rendering for each repeated motion, thus saving unnecessary computing power and reducing the processing time.

Figure 13:
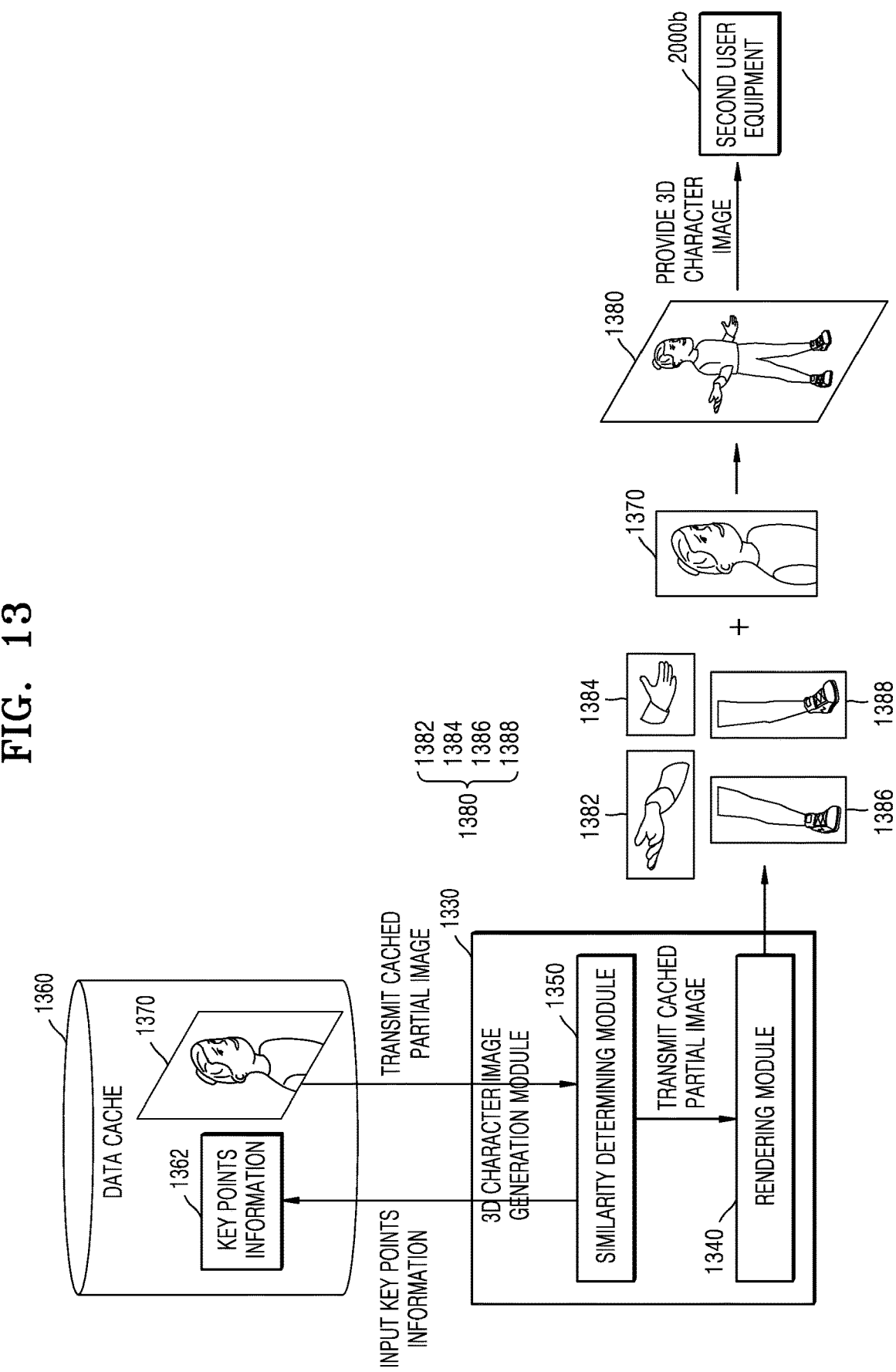
FIG. 13 is a diagram illustrating a method, performed by an edge data network of rendering a 3D character image by using images corresponding to each body part according to an embodiment of the disclosure.

FIG. 13 is a diagram illustrating a method, performed by an edge data network according to an embodiment of the disclosure, of rendering a 3D character image by using images corresponding to each body part and combining the images according to an embodiment of the disclosure.

Referring to FIG. 13, key points information 1362 and a 3D partial image 1370 are stored in a data cache 1360. The 3D partial image 1370 is a partial image rendered using the key points information 1362 including a feature point extracted from a part of the body parts of a user. In the embodiment illustrated in FIG. 13, the 3D partial image 1370 may be an image of the upper body part, which is rendered using the key points information 1362 including a plurality of feature points extracted from features of the upper body parts including the head and chest of the user. The key points information 1362 and the 3D partial image 1370 may be stored in the data cache 1360 as a key-value type.

The processor 1200 of the edge data network 1000 (see FIG. 4) may receive key points information from another edge data network or user equipment located in a remote location. By providing the input key points information to the data cache 1360 by executing data or program code related to the similarity determining module 1350 included in the 3D character image generation module 1330, a similarity between the input key points information and the cached key points information 1362 may be measured. In an embodiment, only at least one feature coordinate value among a plurality of feature coordinate values included in the input key points information may be similar to at least one feature coordinate value among a plurality of feature coordinate values included in the cached key point information. As a result of the measurement, at least one feature coordinate value, a similarity of which is measured to be greater than or equal to a preset threshold, may be a feature coordinate value extracted from the feature points related to the user's upper body part. The processor 1200 may identify the cached key points information 1362 and the 3D partial image 1370 stored as a key-value type. The processor 1200 may obtain the identified 3D partial image 1370 from the data cache 1360.

The processor 1200 may render a 3D partial image of the entire 3D character image 1380 about the other body parts, by using the rest of feature coordinate values except the at least one feature coordinate value, of which the similarity with the key points information 1362 cached in the data cache 1360 exceeds a preset threshold, from among the plurality of feature coordinate values included in the input key points information. In the embodiment illustrated in FIG. 13, by executing data or program code related to the rendering module 1340, the processor 1200 may render the 3D partial image of the entire 3D character image 1380 including a left arm 1382, a right arm 1384, a left leg 1386, and a right leg 1388 by using the remaining feature coordinate values except the at least one feature coordinate value extracted from the feature points of the upper body parts of the user from among the input key point information.

The processor 1200 may generate the entire 3D character image 1380 by combining the 3D partial image of the entire 3D character image 1380 rendered using the rendering module 1340 and the 3D partial image 1370 obtained from the data cache 1360. The processor 1200 may transmit the entire 3D character image 1380 to the second user equipment 2000b via the network interface 1100 (see FIG. 4).

The edge data network 1000 according to the embodiment illustrated in FIG. 13 may cache the 3D partial image 1370 about the upper body parts, the frequency or degree of movement of which is relatively small, in the data cache 1360, and render only the 3D partial image of the entire 3D character image 1380 about the arms and legs with a relatively high frequency or degree, and accordingly, computing power consumption by the processor 1200 for rendering may be reduced, and the rendering time may be shortened.

FIG. 14 is a diagram for describing a structure of modules of each of an edge data network and a user equipment, and data transmission and reception therein according to an embodiment of the disclosure.

Referring to FIG. 14, when a first user equipment 2000a and a second user equipment 2000b hold a teleconference, the first user equipment 2000a may be a user equipment used by a first user making a motion or action, and the second user equipment 2000b may be a user equipment that displays a 3D character image representing the appearance, motion, or action of the first user. A second user may view a 3D character image of the first user via the second user equipment 2000b. In this case, the first user equipment 2000a may be an actor device, and the second user equipment 2000b may be a viewer device. However, the disclosure is not limited thereto. However, the disclosure is not limited thereto, and when a two-way teleconference is held as the first user equipment 2000a and the second user equipment 2000b execute an application client in two directions, the second user equipment 2000b may be an actor device, and the first user equipment 2000a may be a viewer device.

Hereinafter, an embodiment in which the first user equipment 2000a is an actor device, and the second user equipment 2000b is a viewer device will be described.

In operation S1410, the first user equipment 2000a obtains an actor image by capturing an image of the first user. In an embodiment, the first user equipment 2000a may execute an application client, and may film a moving picture or video of the appearance, action or motion of the first user by using a camera, and obtain a plurality of actor images included in the filmed moving picture or video.

In operation S1412, the first user equipment 2000a transmits the actor image and identification information of the first user equipment 2000a (e.g., device id) to the edge data network 1000. In an embodiment, the first user equipment 2000a may sequentially transmit a plurality of actor images to the edge data network 1000. In an embodiment, the first user equipment 2000a may transmit, to the edge data network 1000, not only a plurality of actor images and user equipment identification information of the first user equipment 2000a, but also information about at least one of identification information of the first user (e.g., user id), information of an application client that is run by the first user equipment 2000a, and identification information of a teleconference room (e.g., conference room location information, conference room identification number, etc.).

In operation S1420, the edge data network 1000 extracts key points information of a plurality of feature points from the actor image. The 'plurality of feature points' may be points indicating features related to the body parts, posture, or skeletal structure of the first user in the actor image. The plurality of feature points may be extracted from, for example, features of body parts such as a face, shoulders, arms, thighs, and calves of a human body or features of the skeletal structure. The edge data network 1000 may extract a plurality of feature points from an actor image by using a feature point extraction algorithm and output key points information including the plurality of feature points. A detailed method, performed by the edge data network 1000, of extracting a plurality of feature points by using a feature point extraction algorithm and obtaining key points information, is the same as operation S320 illustrated in FIG. 3, and thus repeated description will be omitted here.

In operation S1430, the second user equipment 2000b obtains view points information of the second user by using a sensor. The 'view points information' is information about a virtual view point from which a 3D character image (e.g., an avatar image) displayed via the second user equipment 2000b is viewed via a virtual camera in a three-dimensional virtual space. The view points information may include virtual position coordinate value information indicating a position and direction in which a virtual camera views a 3D character image.

A detailed method, performed by the second user equipment 2000b, of obtaining view points information by using sensing information obtained using a sensor, is the same as operation S330 illustrated in FIG. 3, and thus, repeated description will be omitted.

In operation S1432, the second user equipment 2000b transmits the view points information and identification information of the second user equipment 2000b (e.g., device id) to the edge data network 1000. In an embodiment, the second user equipment 2000b may transmit, to the edge data network 1000, not only the view points information and identification information of the second user equipment 2000b, but also information about at least one of identification information of the second user (e.g., user id), information of an application client that is run by the second user equipment 2000b, and identification information of a teleconference room (e.g., conference room location information, conference room identification number, etc.).

While operation S1432 is illustrated to be performed temporally after operation S1420 in FIG. 14, this is an example, and operations S1420 and S1432 are not necessarily performed in the illustrated time order. For example, operation S1432 may be performed before operation S1420, or operations S1420 and S1432 may be performed simultaneously. That is, the edge data network 1000 may extract key points information first, or obtain view points information first from the second user equipment 2000b. In this case, the edge data network 1000 may temporarily store data obtained earlier, from among key points information and view points information, in a Request Queue. In an embodiment, by temporarily storing the key points information and the view points information in a Request Queue, even when the key points information and the view points information are obtained at different points in time, the edge data network 1000 may synchronize the key points information and the view points information with each other.

In operation S1440, the edge data network 1000 may measure a key points similarity and a view points similarity by comparing the obtained key points information and view points information with key points information and view points information that are previously stored in a data cache, respectively.

In operation S1450, the edge data network 1000 compares the measured key points similarity with a preset first threshold α, and the measured view points similarity with a preset second threshold β.

As a result of the comparison, when the key points similarity is greater than the first threshold α, and the view points similarity is greater than the second threshold β in operation S1460, the edge data network 1000 identifies a cached 3D character image from the data cache.

In operation S1462, the edge data network 1000 transmits the cached 3D character image to the second user equipment 2000b.

As a result of the comparison, when the key points similarity is equal to or less than the first threshold α, or the view points similarity is equal to or less than the second threshold β in operation S1470, the edge data network 1000 renders a 3D character image by using the key points information and the view points information.

In operation S1472, the edge data network 1000 transmits the rendered 3D character image to the second user equipment 2000b.

Operations S1440 to S1472 are identical to operations S340 to S372 illustrated in FIG. 3, respectively, except that a subject of performing the operations is the edge data network 1000, and thus repeated description will be omitted.

In operation S1480, the second user equipment 2000b displays the 3D character image.

A program executed by the edge data networks 1000, 1000a, and 1000b described in the disclosure may be implemented as a hardware component, a software component, and/or a combination of a hardware component and a software component. A program may be executed by any system capable of executing computer readable instructions.

Software may comprise a computer program, code, instructions, or a combination of one or more of these, and may configure a processing device or independently or collectively instruct the processing device to perform desired operations.

The software may be implemented as a computer program including instructions stored in a computer-readable storage medium. The computer-readable recording medium includes, for example, a magnetic storage medium (e.g., read-only memory (ROM), random-access memory (RAM), floppy disk, hard disk, etc.) and an optically readable medium (e.g., CD-ROM, Digital Versatile Disc (DVD), etc.). The computer-readable recording medium can also be distributed over network coupled computer systems so that the computer-readable code is stored and executed in a distributed fashion. This media can be read by the computer, stored in the memory, and executed by the processor.

A computer-readable storage medium can be provided in the form of a non-transitory storage medium. Here, 'non-transitory' means that the storage medium does not include a signal and is tangible but does not distinguish that data is semi-permanently or temporarily stored in the storage medium.

Also, programs according to the embodiments disclosed in the disclosure may be included in a computer program product and provided in that form. Computer program products can be traded between sellers and buyers as commodities.

The computer program products may include a software program, a computer-readable storage medium in which the software program is stored. For example, the computer program product may include a product in the form of a software program that is electronically distributed (e.g., downloadable application) through a device manufacturer or an electronic market (e.g., Google Play Store™, App Store™) For electronic distribution, at least a portion of a software program may be stored in a storage medium or may be temporarily generated. In this case, the storage medium may be a storage medium of a server of a manufacturer, a server of an electronic market, or a relay server temporarily storing a software program.

In a system consisting of a server and a device, the computer program product may include a storage medium of the server or a storage medium of the device. Alternatively, when there is a third device (e.g., a smartphone) that is connected to the server or the device through communication, the computer program product may include a storage medium of the third device. Alternatively, the computer program product may include software program itself transmitted from the server to the device or the third device, or transmitted from the third device to the device.

In this case, one of the server, the device, and the third device may execute a computer program product to perform the method according to the disclosed embodiments. Alternatively, two or more of the server, the device, and the third device may execute a computer program product to implement the method according to the disclosed embodiments in a distributed manner.

For example, the server may execute a computer program product stored in the server to control a device connected with the server through communication to perform the method according to the disclosed embodiments.

As another example, the third device may execute a computer program product to control the device connected with the third device through communication to perform the method according to the disclosed embodiments.

When the third device executes a computer program product, the third device may download the computer program product from the server and execute the downloaded computer program product. Alternatively, the third device may execute a computer program product provided in a pre-loaded state to perform the method according to the disclosed embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method, performed by an edge data network, of providing a three-dimensional (3D) character image to a user equipment, the method comprising:
   obtaining first key points information comprising a plurality of feature coordinate values related to body parts, posture, or skeletal structure of a first user, extracted from a first image frame captured using a first user equipment, and first view points information comprising virtual position coordinate value information of virtual view points from which a 3D character image displayed via a second user equipment is viewed;
   rendering a 3D character image indicating an appearance, an action, or a motion of the first user based on the obtained first key points information and first view points information;
   storing the rendered 3D character image in a data cache in association with the first key points information and the first view points information;
   obtaining second key points information and second view points information regarding a second image frame obtained after the first image frame;
   measuring a key points similarity and a view points similarity by respectively comparing the obtained second key points information and second view points information with the first key points information and the first view points information previously stored in the data cache; and
   providing the 3D character image previously stored in the data cache to the second user equipment as a 3D character image regarding the second image frame based on the measured key points similarity and the measured view points similarity.

2. The method of claim 1, wherein the obtaining of the first key points information and the first view points information comprises:
   receiving the first image frame obtained by capturing an image of the first user by using the first user equipment, from the first user equipment;
   extracting a plurality of position coordinate values of a plurality of feature coordinate values related to the body parts, posture, or skeletal structure of the first user, from the received first image frame; and obtaining the first key points information comprising the extracted plurality of position coordinate values.

3. The method of claim 1, wherein the storing of the 3D character image in the data cache comprises storing, together with the 3D character image in the data cache, at least one of user identification information of the first user, a plurality of pieces of previously obtained key points information regarding the appearance, actions conducted in the past, motions, postures or directions of the first user, priority information for determining a key points similarity, and information about a teleconference type.

4. The method of claim 1, wherein the measuring of the key points similarity comprises:
obtaining third key points information comprising a plurality of third feature point coordinate values extracted from a third image frame;
respectively calculating a difference value between the plurality of third feature coordinate values included in the third key points information and a plurality of second feature coordinate values included in the second key points information;
identifying at least one third feature coordinate value having the calculated difference value exceeding a preset threshold;
identifying at least one first feature coordinate value corresponding to the identified at least one third feature coordinate value from among a plurality of first feature coordinate values included in the first key points information stored in the data cache; and
measuring a key points similarity between the third key points information and the first key points information by measuring a similarity between the identified at least one third feature coordinate value and the at least one first feature coordinate value.

5. The method of claim 1, wherein the measuring of the key points similarity comprises:
selecting at least one second feature coordinate value extracted from a body part having a high priority according to predetermined priorities, from among a plurality of second feature coordinate values included in the second key points information;
identifying at least one first feature coordinate value corresponding to the selected at least one second feature coordinate value from among a plurality of first feature coordinate values included in the first key points information; and
measuring the key points similarity by measuring a similarity between the at least one first feature coordinate value and the at least one second feature coordinate value.

6. The method of claim 5, further comprising:
calculating a difference value between a plurality of feature coordinate values respectively included in a plurality of pieces of key points information previously obtained through a previously conducted teleconference and stored in the data cache;
listing the calculated difference values in order from large to small; and
determining a priority according to the body parts respectively corresponding to a plurality of position coordinate values based on the order of the listed difference values.

7. The method of claim 1,
wherein a plurality of pieces of key points information constituting a motion are classified according to motion information and stored in the data cache,
wherein the measuring of the key points similarity comprises:
receiving a plurality of pieces of key points information respectively extracted from a plurality of image frames sequentially obtained according to a time flow, and
measuring a similarity between a plurality of pieces of input key points information and the plurality of pieces of key points information previously stored in the data cache, and
wherein the method further comprises:
identifying motion information corresponding to the plurality of pieces of input key points information based on the measured similarity, and
obtaining a plurality of 3D character image frames corresponding to the identified motion information from the data cache.

8. An edge data network for providing a three-dimensional (3D) character image to a user equipment, the edge data network comprising:
a network interface;
a memory storing a program comprising one or more instructions; and
a processor configured to execute the one or more instructions of the program stored in the memory,
wherein the processor is further configured to:
obtain, by using the network interface, first key points information comprising a plurality of feature coordinate values related to body parts, posture, or skeletal structure of a first user, extracted from a first image frame captured using a first user equipment, and first view points information comprising virtual position coordinate value information regarding virtual view points from which a 3D character image displayed via a second user equipment is viewed,
render a 3D character image indicating an appearance, an action, or a motion of the first user based on the obtained first key points information and first view points information,
store the rendered 3D character image in a data cache in the memory in association with the first key points information and the first view points information,
respectively obtain second key points information and second view points information of a second image frame obtained after the first image frame, by using the network interface,
measure a key points similarity and a view points similarity by respectively comparing the obtained second key points information and second view points information with the first key points information and the first view points information previously stored in the data cache, and
provide a 3D character image previously stored in the data cache to the second user equipment as a 3D character image regarding the second image frame based on the measured key points similarity and the measured view points similarity.

9. The edge data network of claim 8, wherein the processor is further configured to:
by using the network interface, receive the first image frame obtained by capturing an image of the first user by using the first user equipment;
from the first user equipment, extract a plurality of position coordinate values of a plurality of feature coordinate values related to the body parts, posture, or skeletal structure of the first user, from the received first image frame; and obtain the first key points information comprising the extracted plurality of position coordinate values.

10. The edge data network of claim 8, wherein the processor is further configured to store, together with the 3D character image in the data cache, at least one of user identification information of the first user, a plurality of pieces of previously obtained key points information regarding the appearance, actions conducted in the past, motions, postures or directions of the first user, priority information for determining a key points similarity, and information about a teleconference type.

11. The edge data network of claim 8, wherein the processor is further configured to:
by using the network interface, obtain third key points information comprising a plurality of third feature point coordinate values extracted from a third image frame;
respectively calculate a difference value between the plurality of third feature coordinate values included in the third key points information and a plurality of second feature coordinate values included in the second key points information;
identify at least one third feature coordinate value having the calculated difference value exceeding a preset threshold;
identify at least one first feature coordinate value corresponding to the identified at least one third feature coordinate value from among a plurality of first feature coordinate values included in the first key points information stored in the data cache; and
measure a key points similarity between the third key points information and the first key points information by measuring a similarity between the identified at least one third feature coordinate value and the at least one first feature coordinate value.

12. The edge data network of claim 8, wherein the processor is further configured to:
select at least one second feature coordinate value extracted from a body part having a high priority according to predetermined priorities, from among a plurality of second feature coordinate values included in the second key points information;
identify at least one first feature coordinate value corresponding to the selected at least one second feature coordinate value from among a plurality of first feature coordinate values included in the first key points information; and
measure the key points similarity by measuring a similarity between the at least one first feature coordinate value and the at least one second feature coordinate value.

13. The edge data network of claim 12, wherein the processor is further configured to:
calculate a difference value between a plurality of feature coordinate values respectively included in a plurality of pieces of key points information previously obtained through a previously conducted teleconference and stored in the data cache;
list the calculated difference values in order from large to small; and
determine a priority according to the body parts respectively corresponding to a plurality of position coordinate values based on the order of the listed difference values.

14. The edge data network of claim 8,
wherein a plurality of pieces of key points information constituting a motion are classified according to motion information and stored in the data cache, and
wherein the processor is further configured to:
receive a plurality of pieces of key points information respectively extracted from a plurality of image frames sequentially obtained according to a time flow,
measure a similarity between the plurality of pieces of input key points information and the plurality of pieces of key points information previously stored in the data cache,
identify motion information corresponding to the plurality of pieces of input key points information based on the measured similarity, and
obtain a plurality of 3D character image frames corresponding to the identified motion information from the data cache.

15. A computer program product comprising a non-transitory computer-readable storage medium, wherein the storage medium comprises instructions executed by an edge data network to:
obtain first key points information comprising a plurality of feature coordinate values related to body parts, posture, or skeletal structure of a first user, extracted from a first image frame captured using a first user equipment, and first view points information comprising virtual position coordinate value information of virtual view points from which a three-dimensional (3D) character image displayed via a second user equipment is viewed;
render a 3D character image indicating an appearance, an action, or a motion of the first user based on the obtained first key points information and first view points information;
store the rendered 3D character image in a data cache in association with the first key points information and the first view points information;
obtain second key points information and second view points information regarding a second image frame obtained after the first image frame;
measure a key points similarity and a view points similarity by respectively comparing the obtained second key points information and second view points information with the first key points information and the first view points information previously stored in the data cache; and
provide the 3D character image previously stored in the data cache to the second user equipment as a 3D character image regarding the second image frame based on the measured key points similarity and the measured view points similarity.

* * * * *